(12) United States Patent
Ogikubo et al.

(10) Patent No.: US 9,886,135 B2
(45) Date of Patent: *Feb. 6, 2018

(54) CAPACITIVE TOUCH PANEL

(71) Applicant: FUJIFILM Corporation, Minato-ku, Tokyo (JP)

(72) Inventors: Shinya Ogikubo, Ashigara-kami-gun (JP); Michihiro Shibata, Ashigara-kami-gun (JP); Yasuhiro Mitamura, Ashigara-kami-gun (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 67 days.

This patent is subject to a terminal disclaimer.

(21) Appl. No.: 15/157,071

(22) Filed: May 17, 2016

(65) Prior Publication Data

US 2016/0259482 A1     Sep. 8, 2016

Related U.S. Application Data

(63) Continuation of application No. PCT/JP2014/079066, filed on Oct. 31, 2014.

(30) Foreign Application Priority Data

Nov. 20, 2013  (JP) .................. 2013-240084

(51) Int. Cl.
| | |
|---|---|
| G06F 3/041 | (2006.01) |
| C09J 201/00 | (2006.01) |
| G06F 3/044 | (2006.01) |
| B32B 3/08 | (2006.01) |
| B32B 7/12 | (2006.01) |

(52) U.S. Cl.
CPC ............ *G06F 3/0418* (2013.01); *B32B 3/085* (2013.01); *B32B 7/12* (2013.01); *C09J 201/00* (2013.01);

(Continued)

(58) Field of Classification Search
CPC ........ B32B 2307/412; B32B 2457/208; B32B 3/085; B32B 7/12; C09J 201/00;

(Continued)

(56) References Cited

U.S. PATENT DOCUMENTS 9,645,691 B2 *  5/2017  Ogikubo ................. G06F 3/044
9,740,350 B2 *  8/2017  Ogikubo ................. B32B 27/00
(Continued)

FOREIGN PATENT DOCUMENTS

JP     2008-310551 A    12/2008

OTHER PUBLICATIONS

International Preliminary Report on Patentability dated Jun. 2, 2016 from the International Bureau in counterpart International Application No. PCT/JP2014/079066.

(Continued)

*Primary Examiner* — Tony Davis
(74) *Attorney, Agent, or Firm* — Sughrue Mion, PLLC

(57) ABSTRACT

The invention provides a capacitive touch panel that hardly cause malfunction in a wide range of temperature environment from a low temperature to a high temperature. The capacitive touch panel according to the invention is a capacitive touch panel including a display device, a lower adhesive layer, a capacitive touch panel sensor, an upper adhesive layer, and a protective substrate in this order, in which a maximum value of tan σ of the upper adhesive layer and a maximum value of tan σ of the lower adhesive layer obtained from a temperature dependency evaluation test is 0.08 or less, and tan σ of the lower adhesive layer at each temperature of every 20° C. from −40° C. to 80° C. is equal to or less than tan σ of the upper adhesive layer.

12 Claims, 3 Drawing Sheets

(52) U.S. Cl.
CPC .............. *G06F 3/041* (2013.01); *G06F 3/044* (2013.01); *G06F 3/0412* (2013.01); *B32B 2255/26* (2013.01); *B32B 2307/412* (2013.01); *B32B 2457/208* (2013.01); *G06F 2203/04102* (2013.01); *G06F 2203/04103* (2013.01); *G06F 2203/04112* (2013.01)

(58) Field of Classification Search
CPC . G06F 2203/04102; G06F 2203/04103; G06F 2203/04112; G06F 3/041; G06F 3/0412; G06F 3/0418; G06F 3/044
USPC .................................................. 345/170–176
See application file for complete search history.

(56) References Cited

U.S. PATENT DOCUMENTS

| | | | | |
|---|---|---|---|---|
| 2012/0025674 | A1* | 2/2012 | Yoshida | C08G 63/08 310/365 |
| 2015/0355754 | A1* | 12/2015 | Ogikubo | G06F 3/044 345/174 |
| 2016/0004356 | A1* | 1/2016 | Ogikubo | B32B 27/00 345/174 |
| 2016/0162076 | A1* | 6/2016 | Fukagawa | C09J 7/00 345/174 |
| 2016/0253035 | A1* | 9/2016 | Mitamura | B32B 7/12 345/174 |
| 2016/0259482 | A1* | 9/2016 | Ogikubo | C09J 201/00 |
| 2016/0355705 | A1* | 12/2016 | Kawano | C09J 7/0264 |
| 2017/0115780 | A1* | 4/2017 | Ogikubo | G06F 3/044 |

OTHER PUBLICATIONS

International Search Report of PCT/JP2014/079066 dated Dec. 16, 2014.

* cited by examiner

US 9,886,135 B2

CAPACITIVE TOUCH PANEL

CROSS-REFERENCE TO RELATED APPLICATIONS

This application is a Continuation of PCT International Application No. PCT/JP2014/079066 filed on Oct. 31, 2014, which claims priority under 35 U.S.C. §119(a) to Japanese Patent Application No. 2013-240084 filed on Nov. 20, 2013. The above application is hereby expressly incorporated by reference, in its entirety, into the present application.

BACKGROUND OF THE INVENTION

1. Field of the Invention

The invention relates to a capacitive touch panel in which tan s of a lower adhesive layer and an upper adhesive layer of the capacitive touch panel satisfy a predetermined relationship.

2. Description of the Related Art

In recent years, the rate of installation of touch panels in cell phones, portable game equipment, or the like has increased, and for example, capacitive touch panels enabling multipoint detection have attracted attention (see JP2008-310551A).

SUMMARY OF THE INVENTION

In order to meet the requirements for an increase in size of capacitive touch panels, it is required to that position detection is performed with high accuracy. Meanwhile, capacitive touch panels are required not to malfunction under various use environments such as a cold region and a warm region.

However, if screen size of the capacitive touch panel in the related art is increased, malfunction easily occurs depending on use environments, and the requirements above are not satisfied, and thus further improvements are required.

In view of the circumstances, an object of the invention is to provide a capacitive touch panel that hardly causes malfunction in a wide temperature environment range from a low temperature to a high temperature.

The inventors have diligently conducted examinations and, as a result, found that the malfunction can be suppressed, by controlling tan σ of the adhesive layer included in the capacitive touch panel. Based on this knowledge, the inventors conducted research and found that the above objects are achieved by the configurations below.

(1) A capacitive touch panel, comprising: a display device; a lower adhesive layer; a capacitive touch panel sensor; an upper adhesive layer; and a protective substrate, in this order, in which a maximum value of tan σ of the upper adhesive layer and a maximum value of tan σ of the lower adhesive layer, which are obtained from a temperature dependency evaluation test (Test 1) are 0.08 or less, and also tan σ of the lower adhesive layer at respective temperatures of every 20° C. from −40° C. to 80° C. is tan σ or less of the upper adhesive layer, and in which a maximum value of tan σ of the upper adhesive layer and a maximum value of tan σ of the lower adhesive layer which are obtained from a temperature dependency evaluation test (Test 2) are 0.08 or less, and also tan σ of the lower adhesive layer at respective temperatures of every 20° C. from −40° C. to 80° C. is equal to or less than tan σ of the upper adhesive layer.

(2) The capacitive touch panel according to (1), in which a maximum value of tan σ of the upper adhesive layer and a maximum value of tan σ of the lower adhesive layer obtained from the temperature dependency evaluation test (Test 1) are 0.06 or less, and in which a maximum value of tan σ of the upper adhesive layer and a maximum value of tan σ of the lower adhesive layer obtained from the temperature dependency evaluation test (Test 2) are 0.06 or less.

(3) The capacitive touch panel according to (1) or (2), in which the capacitive touch panel sensor is a laminate comprising detection electrodes on both surfaces of the substrate and a laminate obtained by sticking substrates with detection electrodes comprising detection electrodes on one surface thereof via an adhesive layer.

(4) The capacitive touch panel according to (3), in which the detection electrode is configured with any one selected from the group consisting of gold, silver, copper, aluminum, ITO, tin oxide, zinc oxide, cadmium oxide, gallium oxide, titanium oxide, a silver palladium alloy, and a silver palladium copper alloy.

(5) The capacitive touch panel according to any one of (1) to (4), in which a size of the display surface of the display device in the diagonal direction is 5 inches or greater.

According to the invention, it is possible to provide a capacitive touch panel that hardly causes malfunction in a wide temperature environment range from a low temperature to a high temperature.

DESCRIPTION OF THE PREFERRED EMBODIMENTS

Hereinafter, preferable aspects of a capacitive touch panel (hereinafter, also referred to as "touch panel") of the invention will be described with reference to the drawings.

The characteristic of the capacitive touch panel of the invention is to control tan σ of a lower adhesive layer and tan σ of an upper adhesive layer. Specifically, a maximum value of tan σ of the lower adhesive layer and a maximum value of tan σ of the upper adhesive layer obtained from the temperature dependency evaluation test described below are a predetermined value or less, and tan σ of the lower adhesive layer in each measurement temperature is equal to or less than tan σ of the upper adhesive layer. The reason why the desired effect can be obtained with this configuration is described in detail below.

A cell phone comprising a touch panel is exposed to various temperatures depending on the use environment, and is also required to react to an environment with a drastic temperature change (from heated indoor to the outside air during the winter or from cooled indoor to automobile interior during the summer), but there is a case where malfunction frequently occurs. The present inventors have found influence of the adhesive layers in the touch panel as a cause of malfunction. Specifically, there is a problem in that, if the size of the screen of the touch panel increases, minute currents flow through an adhesive layer between detection electrodes depending on the use environment such that an energy loss easily occurs and thus malfunction easily occurs. Therefore, tan σ (dielectric tangent) of the lower adhesive layer and the upper adhesive layer included in the touch panel is controlled to a predetermined value, and also tan σ of the lower adhesive layer measured in the predetermined method is controlled to be equal to or less than tan σ of the upper adhesive layer at each temperature. The size of tan σ represents energy consumption (loss) of the material. As tan σ becomes smaller, energy loss becomes small, and thus electrostatic capacitance becomes a desired value, such that a stable touch panel operation becomes possible. It is known that if tan σ of the lower adhesive layer is caused to be equal to or less than tan σ of the upper adhesive layer, in other words, if a minute current in the lower adhesive layer is further suppressed, the tan σ of the lower adhesive layer or the minute current contributes to a stable operation. The reason why tan σ of the lower adhesive layer is caused to be smaller in this manner is assumed as follows. Since the display device is closer on the lower adhesive layer side, thermal influence is easily received from the display device. Therefore, it is assumed that lower tan σ is required on the lower adhesive layer side.

Figure 1:
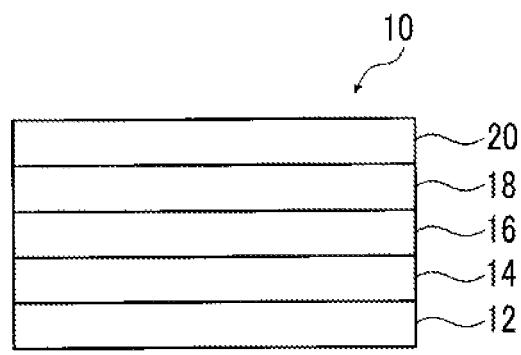
FIG. 1 is a cross-sectional view of an embodiment of a capacitive touch panel of the invention.

FIG. 1 is a cross-sectional view of an embodiment of a capacitive touch panel of the invention. The diagram according to the invention is a schematic diagram, and thickness relationships or positional relationships of the respective layers are not necessarily identical to the actual relationships.

As illustrated in FIG. 1, a capacitive touch panel 10 comprises a display device 12, a lower adhesive layer 14, a capacitive touch panel sensor 16, an upper adhesive layer 18, and a protective substrate 20 in this order. In the capacitive touch panel 10, if a finger comes close to and into contact with the protective substrate 20, an electrostatic capacitance between the finger and a detection electrode in the capacitive touch panel sensor 16 changes. Here, a position detection driver (not illustrated) always detects the change of the electrostatic capacitance between the finger and the detection electrode. If the position detection driver detects the change of the electrostatic capacitance in the predetermined value or greater, a position at which the change of the electrostatic capacitance is detected is detected, as an input position. In this manner, the capacitive touch panel 10 can detect an input position.

Hereinafter, respective members of the capacitive touch panel 10 are described in detail. First, aspects of the lower adhesive layer 14 and the upper adhesive layer 18 which are characteristics of the invention are described in detail, and then other members are described in detail.

(Lower Adhesive Layer)

The lower adhesive layer 14 is a layer for securing adhesiveness between the display device 12 described below and the capacitive touch panel sensor 16 described below.

The maximum value of tan σ of the lower adhesive layer 14 obtained from a temperature dependency evaluation test (Test 1) described below is 0.08 or less. Since malfunction of the touch panel hardly occurs, the maximum value is preferably 0.06 or less, more preferably 0.04 or less, and even more preferably 0.02 or less. The lower limit is not particularly limited, but the lower the lower limit is, the more preferable. The lower limit is most preferably 0, but is 0.001 or greater in many cases.

If the maximum value of tan σ of the lower adhesive layer 14 obtained from the temperature dependency evaluation test (Test 1) is greater than 0.08, malfunction of the touch panel easily occurs.

In addition, the maximum value of tan σ of the lower adhesive layer 14 obtained from a temperature dependency evaluation test (Test 2) described below is also 0.08 or less, and the preferable range thereof is the same as the preferable range of tan σ obtained from the temperature dependency evaluation test (Test 1).

In a case where the maximum value of tan σ of the lower adhesive layer 14 obtained from the temperature dependency evaluation test (Test 2) is greater than 0.08, malfunction of the touch panel easily occurs.

As illustrated above, tan σ is a dielectric tangent and represents a degree of an energy loss of the material. tan σ is a value taking a ratio ($\in$r"/$\in$r') of a real part ($\in$r') and an imaginary part ($\in$r") of a complex relative dielectric constant.

The method of performing the temperature dependency evaluation test (Test 1) is described in detail below. The measurement using the impedance measurement at each temperature described below is generally called a capacity method.

Figure 2:
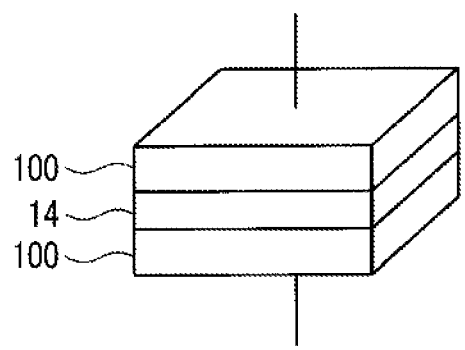
FIG. 2 is a schematic diagram of a sample for evaluation which is used in a temperature dependency evaluation test.

First, as illustrated in FIG. 2, the lower adhesive layer 14 (thickness: 100 μm to 500 μm) which is a measurement target is sandwiched between a pair of aluminum electrodes 100 (electrode area: 20 mm×20 mm), a pressurizing and defoaming treatment is performed at 40° C. at 5 atmospheres for 60 minutes, so as to produce a sample for evaluation.

Thereafter, the temperature of the lower adhesive layer in the sample is increased from −40° C. to 80° C. by 20° C. in stages to obtain tan σ by impedance measurement at 100 MHz using an impedance analyzer (4294A manufactured by Agilent Technologies) at each temperature.

Specifically, the temperature of the lower adhesive layer is increased in stages so as to be −40° C., −20° C., 0° C., 20° C., 40° C., 60° C., and 80° C., and the lower adhesive layer is left for 5 minutes at each temperature until the temperature of the adhesive layer is stabilized. Then, at the temperature, tan σ is obtained by impedance measurement at 100 MHz.

Thereafter, the maximum value of tan σ at each temperature measured above is extracted.

In the method for performing the temperature dependency evaluation test (Test 2), tan σ of the lower adhesive layer is measured in the same order of the temperature dependency evaluation test (Test 1) except for changing a measurement frequency in the temperature dependency evaluation test (Test 1) from 100 kHz to 1 MHz.

The thickness of the lower adhesive layer 14 is not particularly limited, but the thickness is preferably 5 μm to 350 μm, more preferably 30 μm to 250 μm, and even more preferably 30 μm to 150 μm. If the thickness is in the range described above, desired transmittance of the visible light can be obtained, and also handling is facilitated.

The lower adhesive layer 14 is preferably optically transparent. That is, a transparent adhesive layer is preferable. The expression "optically transparent" means that the total light transmittance is 85% or higher. The total light transmittance is preferably 90% or higher, and more preferably 100% or higher.

The type of the material (adhesive agent) configuring the lower adhesive layer 14 is not particularly limited, as long as the material satisfies tan σ described above. Examples thereof include a rubber-based adhesive agent (rubber-based adhesive insulating material), a (meth)acryl-based adhesive agent ((meth)acrylic adhesive insulating material), and a silicone-based adhesive agent (silicone-based adhesive insulating material). Among these, in view of excellent transparency, a (meth)acryl-based adhesive agent is preferable, and in view of low dielectric loss, a rubber-based adhesive agent is preferable. The (meth)acryl-based adhesive agent means an acryl-based adhesive agent and/or a methacryl-based adhesive agent (methacryl-based adhesive agent).

A (meth)acryl-based adhesive agent which is a preferred aspect of the adhesive insulating material having an alkyl (meth)acrylate-derived repeating unit includes a (meth)acrylic polymer. The (meth)acryl-based adhesive agent is included as the (meth)acrylic polymer is included as a base polymer. However, other components (tacktifiers, rubber components, or the like as described below) may be included.

In a case where a tacktifier and/or a rubber component is included in a (meth)acryl-based adhesive agent, in view of preventing the generation of the malfunction in the capacitive touch panel (hereinafter, simply referred to as "in view of excellently exhibiting the effect of the invention", the content of the (meth)acrylic polymer is preferably 10 mass % to 75 mass %, more preferably 15 mass % to 50 mass %, and even more preferably 20 mass % to 45 mass % with respect to the total mass of the lower adhesive layer 14.

In a case where a tacktifier and a rubber component are not included in the (meth)acryl-based adhesive agent, in view of excellently exhibiting the effect of the invention, the content of the (meth)acrylic polymer is preferably 75 mass % to 100 mass %, more preferably 85 mass % to 100 mass %, and even more preferably 90 mass % to 99 mass % with respect to the total mass of the lower adhesive layer 14.

In addition, (meth)acrylate means acrylate and/or methacrylate. Among (meth)acrylic polymers, in view of excellent adhesiveness, a (meth)acrylic polymer having an alkyl (meth)acrylate-derived repeating unit which is an alkyl group having about 1 to 20 carbon atoms is preferable. In addition, in view of low dielectric loss, a (meth)acrylic polymer having a (meth)acrylate-derived repeating unit which has less polar groups is preferable.

In view of adhesiveness and a low dielectric loss, specific examples of the repeating unit of the (meth)acrylic polymer include monomer-derived repeating units such as dicyclopentenyl (meth)acrylate, dicyclopentenyloxyethyl (meth)acrylate, dicyclopentenyl (meth)acrylate, 2-ethylhexyl (meth)acrylate, dodecyl (meth)acrylate, isobornyl (meth)acrylate, benzyl (meth)acrylate, and (meth)acryloylmorpholine.

Among these, in view of excellently exhibiting the effect of the invention, a (meth)acryl-based adhesive agent including a (meth)acrylic polymer having a (meth)acrylate monomer-derived repeating unit (hereinafter, referred to as a repeating unit X) having a hydrocarbon group (preferably an aliphatic hydrocarbon group) having 6 or more carbon atoms (preferably having 6 to 20 carbon atoms and more preferably having 8 to 18 carbon atoms) is preferable.

Examples of the (meth)acrylate monomer having a hydrocarbon group (preferably, an aliphatic hydrocarbon group) having the above-described number of carbon atoms include (meth)acrylate having a chain aliphatic hydrocarbon group having the above-described carbon atoms and (meth)acrylate having a cyclic aliphatic hydrocarbon group having the above-described carbon atoms. Specific examples thereof include hexyl (meth)acrylate, 2-ethylhexyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, n-dodecyl (meth)acrylate, n-tridecyl (meth)acrylate, n-tetradecyl (meth)acrylate, n-hexadecyl (meth)acrylate, stearyl (meth)acrylate, cyclohexyl (meth)acrylate, benzyl (meth)acrylate, isobornyl (meth)acrylate, dicyclopentenyl (meth)acrylate, dicyclopentanyl (meth)acrylate, and dicyclopentenyloxyethyl (meth)acrylate. Among the (meth)acrylate monomers described above, since a glass transition temperature (Tg) of the adhesive agent is easily controlled, and the malfunction of the capacitive touch panel hardly occurs, a combination of (meth)acrylate having a chain aliphatic hydrocarbon group such as 2-ethylhexyl (meth)acrylate, isodecyl (meth)acrylate, or n-dodecyl (meth)acrylate with (meth)acrylate having a cyclic aliphatic hydrocarbon group such as isobornyl (meth)acrylate or dicyclopentenyloxyethyl (meth)acrylate is more preferable. Specifically, one of the preferred aspects of the (meth)acrylic polymer includes a (meth)acrylic polymer having a (meth)acrylate monomer-derived repeating unit having a chain aliphatic hydrocarbon group and a (meth)acrylate monomer-derived repeating unit having a cyclic aliphatic hydrocarbon group.

Among (meth)acrylic polymers, in view of excellently exhibiting the effect of the invention, the content of the repeating unit X is preferably 90 mole % or higher and more preferably 95 mole % or higher with respect to the total repeating unit of the (meth)acrylic polymer. The upper limit is not particularly limited, but the upper limit is 100 mole %.

In addition to monomers described above, a repeating unit derived from a monomer (for example, carboxylic acid group-containing (meth)acrylate (for example, an acrylic acid), hydroxy group-containing (meth)acrylate (for example, 2-hydroxyethyl acrylate)) may be included in the (meth)acrylic polymer, without deteriorating the effect of the invention.

Examples of the other monomer include a (meth)acrylic acid, benzyl (meth)acrylate, phenoxyethyl (meth)acrylate, butoxyethylene glycol (meth)acrylate, butoxydiethylene glycol (meth)acrylate, methoxytriethylene glycol (meth)acrylate, tetrahydrofurfuryl (meth)acrylate, 2-hydroxyethyl (meth)acrylate, 3-hydroxypropyl (meth)acrylate, 4-hydroxybutyl (meth)acrylate, tetraethylene glycol monomethylether (meth)acrylate, hexaethylene glycol monomethylether (meth)acrylate, octaethylene glycol monomethylether (meth)acrylate, nonaethylene glycol methylether (meth)acrylate, heptapropylene glycol monomethylether (meth)acrylate, tetraethylene glycol ethylether (meth)acrylate, tetraethylene glycol mono(meth)acrylate, hexaethylene glycol mono(meth)acrylate, octapropylene glycol mono(meth)acrylate, glycidyl (meth)acrylate, 4-hydroxybutyl (meth)acrylateglycidylether, 3,4-epoxycyclohexylmethyl (meth)acrylate, N,N-dimethyl (meth)acrylamide, N,N-diethyl (meth)acrylamide, N-t-butyl (meth)acrylamide, N,N-isopropyl (meth)acrylamide, N-t-octyl (meth)acrylamide, N,N-dimethylaminoethyl (meth)acrylamide, N,N-dimethylaminopropyl (meth)acrylamide, diacetone acrylamide, (meth)acryloylmorpholine, N-vinylpyrrolidone, and N-vinylcaprolactam.

Further, the (meth)acrylic polymer may have a crosslinking structure. The method of forming the crosslinking structure is not particularly limited, but examples thereof include a method of using a bifunctional (meth)acrylate monomer or polyfunctional (meth)acrylate such as a trifunctional or higher (meth)acrylate monomer or a method of introducing a reactive group (for example, a hydroxyl group) to a (meth)acrylic polymer and causing the reactive group to react with a crosslinking agent with the reactive group (for example, an isocyanate-based crosslinking agent). In a case of using a crosslinking agent, a crosslinking structure derived from a crosslinking agent (for example, derived from an isocyanate-based crosslinking agent) is included in the lower adhesive layer.

The bifunctional (meth)acrylate monomer may be a monomer containing two (meth)acryloyl groups, and examples thereof include ethylene glycol di(meth)acrylate, diethylene glycol di(meth)acrylate, tetraethylene glycol di(meth)acrylate, polyethylene glycol di(meth)acrylate, propylene glycol di(meth)acrylate, dipropylene glycol di(meth) acrylate, polypropylene glycol di(meth)acrylate, neopentyl glycol di(meth)acrylate, ethylene oxide-modified bisphenol A-type di(meth)acrylate, propylene oxide-modified bisphenol A-type di(meth)acrylate, 1,3-butanediol di(meth)acrylate, 1,4-butanediol di(meth)acrylate, 1,6-hexanediol di(meth)acrylate, 1,6-hexanediolethylene oxide-modified di(meth)acrylate, 1,9-nonanediol di(meth)acrylate, 1,10-decanediol di(meth)acrylate, glycerol di(meth)acrylate, pentaerythritol di(meth)acrylate, ethylene glycol diglycidylether di(meth)acrylate, diethylene glycol diglycidylether di(meth)acrylate, phthalic acid diglycidylester di(meth)acrylate, hydroxypivalic acid-modified neopentyl glycol di(meth)acrylate, isocyanuric acid ethylene oxide-modified diacrylate, and 2-(meth)acryloyloxyethyl acid phosphate diester.

The trifunctional or higher (meth)acrylate monomer may be a monomer containing 3 or more (meth)acryloyl groups, and examples thereof include trimethylolpropane tri(meth) acrylate, pentaerythritol tri(meth)acrylate, pentaerythritol tetra(meth)acrylate, dipentaerythritol tri(meth)acrylate, dipentaerythritol tetra(meth)acrylate, dipentaerythritol penta (meth)acrylate, dipentaerythritol hexa(meth)acrylate, tri (meth)acryloyloxyethoxy trimethylolpropane, glycerol polyglycidylether poly(meth)acrylate, isocyanuric acid ethylene oxide-modified tri(meth)acrylate, ethylene oxide-modified dipentaerythritol penta(meth)acrylate, ethylene oxide-modified dipentaerythritol hexa(meth)acrylate, ethylene oxide-modified pentaerythritol tri(meth)acrylate, ethylene oxide-modified pentaerythritol tetra(meth)acrylate, and succinic acid-modified pentaerythritol tri(meth)acrylate.

The usage amount of the polyfunctional (meth)acrylate monomer is not particularly limited, but the usage amount is preferably 0 mass % to 5 mass %. In view of compatibility with flexibility and adhesiveness of the adhesive layer, the usage amount thereof is more preferably 0.01 mass % to 2 mass %, even more preferably 0.02 mass % to 1 mass %, and most preferably 0.05 mass % to 0.5 mass % with respect to the total solid content of the composition for forming the adhesive layer described below.

The crosslinking agent may be used alone or in combination of two or more types thereof, and preferably included in the usage amount as a total amount of the crosslinking agent.

In addition, the isocyanate-based crosslinking agent or the epoxy-based crosslinking agent as the crosslinking agent is not particularly limited, and well-known products can be appropriately used.

Examples of the isocyanate-based crosslinking agent include adduct products of 2,4-tolylene diisocyanate, 2,6-tolylene diisocyanate, hydrogenated tolylene diisocyanate, 1,3-xylylene diisocyanate, 1,4-xylylene diisocyanate, hexamethylene diisocyanate, diphenylmethane-4,4-diisocyanate, isophorone diisocyanate, 1,3-bis(isocyanatomethyl)cyclohexane, tetramethylxylylene diisocyanate, 1,5-naphthalene diisocyanate, triphenylmethane triisocyanate, and polyisocyanate compounds thereof, with a polyol compound such as trimethylolpropane, biuret products of these polyisocyanate compounds, or isocyanurate products.

Examples of the epoxy-based crosslinking agent include a bisphenol A•epichlorohydrin-type epoxy resin, ethylene glycol diglycidylether, polyethylene glycol diglycidylether, glycerol diglycidylether, glycerol triglycidylether, 1,6-hexanediol diglycidylether, trimethylolpropane triglycidylether, sorbitol polyglycidylether, polyglycerol polyglycidylether, pentaerythritol polyglycidylerythritol, and diglycerol polyglycidylether.

The usage amounts of the isocyanate-based crosslinking agent and the epoxy-based crosslinking agent are not particularly limited, but the usage amounts are preferably 0 mass % to 3 mass % with respect to the total solid content of the composition for forming the adhesive layer described below. In view of the compatibility with the flexibility and the adhesive of the adhesive layer, the usage amount is more preferably 0.01 mass % to 2 mass %, even more preferably 0.1 mass % to 1 mass %, and most preferably 0.1 mass % to 0.5 mass %.

These crosslinking agents may be used alone or in combination of two or more types thereof and are preferably included in the usage amount as a total amount of the crosslinking agent.

The rubber-based adhesive insulating material is a material with a rubber-based polymer having a rubber-derived repeating unit as a main component. In view of viscoelasticity, isoprene-based rubber is preferable. Specific examples include an esterified product of a maleic anhydride adduct of an isoprene polymer and 2-hydroxyethyl methacrylate.

If necessary, a tacktifier may be included in the lower adhesive layer 14. As the tacktifier, a tacktifier that is appropriately selected from those well-known in the field of patches or patch preparations. Examples thereof include petroleum-based resins (for example, aromatic petroleum resin, aliphatic petroleum resin, resin obtained by C9 fraction, and the like), terpene-based resins (for example, α-pinene resin, β-pinene resin, terpene phenol copolymer, hydrogenated terpene phenol resin, aromatic modified hydrogenated terpene resin, and abietic ester resin), rosin-based resins (for example, partially hydrogenated gum rosin resin, erythritol modified wood rosin resin, tall oil rosin resin, and wood rosin resin), coumarone indene resins (for example, coumarone indene-styrene copolymer), and styrene-based resins (for example, polystyrene, a copolymer of styrene and α-methylstyrene, and the like).

The terpene-based resin includes a terpene resin, a terpenephenol resin, a hydrogenated terpenephenol resin, a hydrogenated terpene resin, an aromatic modified hydrogenated terpene resin, and an aromatic modified terpene resin. However, a terpene resin and a hydrogenated terpene resin are preferable, and a hydrogenated terpene resin is most preferable.

Specific examples thereof include CLEARON P150, CLEARON P135, CLEARON P125, CLEARON P115, CLEARON P105, and CLEARON P85 (manufactured by Yasuhara Chemical Co., Ltd.). Numerical values followed by CLEARON P above indicate softening points of the respective components. That is, CLEARON P150 means to have a softening point of 150° C.

The tacktifiers can be used alone or in combination of two or more types thereof, and in a case where two or more types are used in combination, for example, different types of resins may be combined, or resins of the same type having different softening points may be combined.

The content of the tacktifier in the lower adhesive layer 14 is not particularly limited, but in view of excellently exhibiting the effect of the invention, the content thereof is preferably 10 mass % to 60 mass % and more preferably 10 mass % to 50 mass %.

A rubber component (softening agent) may be included in the lower adhesive layer 14.

Examples of the rubber component include polyolefin or modified polyolefin. Examples of the rubber component include natural rubber, polyisobutylene, polybutadiene (modified liquid polybutadiene, 1,4-butadiene, 1,2-butadiene, a polymer of a copolymer mixture thereof, or the like), hydrogenated polyisoprene, hydrogenated polybutadiene, polyisoprene, polybutene, a styrene butadiene copolymer, a copolymer in combination arbitrarily selected from these groups, or a polymer mixture. Examples of more preferable rubber components include polyisobutylene, polyisoprene, and polybutadiene. Polyisoprene is most preferable. In this specification, polybutadiene, polyisoprene, or the like is one type of polyolefin.

The content of the rubber component in the lower adhesive layer 14 is not particularly limited. However, in view of excellently exhibiting the effect of the invention, the content thereof is preferably 20 mass % to 75 mass % and more preferably 25 mass % to 60 mass %.

The resin of the lower adhesive layer 14 (for example, (meth)acrylic polymer) is preferably cured depending on polymerization initiators. As the polymerization initiator to be used, a thermal polymerization initiator or a photopolymerization initiator is used. Examples of the photopolymerization initiator include 1-hydroxy-cyclohexyl-phenyl-ketone, 2-methyl 1-[4 (methylthio)phenyl]-2-morpholinopropan-1-one, 2-benzyl-2-dimethylamino-1-(4-morpholinophenyl)-butanone-1, bis(2,4,6-trimethylbenzoyl)-phenylphosphine oxide, 2,4,6-trimethylbenzoyl-diphenyl-phosphine oxide, and 4-(2-hydroxyethoxy)phenyl(2-hydroxy-2-propyl)ketone.

Examples of the thermal polymerization initiator include an azo-based compound such as 2,2'-azobisisobutyronitrile, 2,2'-azobis(2-methylbutyronitrile), 1,1'-azobis(cyclohexane-1-carbonitrile), 2,2'-azobis(2,4-dimethylvaleronitrile), 2,2'-azobis(2,4-dimethyl-4-methoxyvaleronitrile), dimethyl-2,2'-azobis(2-methylpropionate), and 2,2'-azobis (2-hydroxymethylpropionitrile); organic peroxide such as lauryl peroxide, tert-butyl hydroperoxide, benzoyl peroxide, tert-butyl peroxybenzoate, cumene hydroperoxide, diisopropyl peroxydicarbonate, dipropyl peroxydicarbonate, tert-butyl peroxyneodecanoate, tert-butyl peroxypivalate, and (3,5,5-trimethylhexanoyl)peroxide; and inorganic peroxide such as potassium persulfate, ammonium persulfate, and hydrogen peroxide. A redox-based initiator using peroxide and a reducing agent together can be used as a polymerization initiator.

For the purpose of adjusting the molecular weight of the polymerization reaction, a chain transfer agent may be added. As the chain transfer agent, a thiol-based compound can be used. Specific examples thereof include dodecanethiol, tetraethylene glycol bis(3-mercaptopropionate), trimethylolpropanetris(3-mercaptopropionate), pentaerythritol tetrakis(3-mercaptopropionate), and dipentaerythritol hexakis(3-mercaptopropionate).

(Method of Manufacturing Lower Adhesive Layer 14)

The method of manufacturing the lower adhesive layer 14 is not particularly limited, and can be manufactured by a known method. Examples thereof include a method of forming the lower adhesive layer 14 by coating a predetermined substrate (for example, a peeling film) with the aforementioned composition (the composition for forming the adhesive layer (hereinafter, simply referred to as "composition")) including a (meth)acrylate monomer and a polymerization initiator having a hydrocarbon group having a predetermined number of carbon atoms, and performing a hardening treatment, if necessary.

Examples of the (meth)acrylate monomer include monomers exemplified above. In view of excellently exhibiting the effect of the invention, a (meth)acrylate monomer having a hydrocarbon group (preferably, an aliphatic hydrocarbon group) having 6 or more carbon atoms (preferably, having 6 to 20 carbon atoms and more preferably having 8 to 18 carbon atoms) is exemplified, and a combination of (meth) acrylate having a chain aliphatic hydrocarbon group having the above-described carbon atoms and (meth)acrylate having a cyclic aliphatic hydrocarbon group having the above-described carbon atoms is more preferable.

At least one type selected from the group consisting of a tacktifier and a rubber component or a chain transfer agent may be included in this composition, if necessary.

If necessary, the composition may contain a solvent. Examples of the solvent to be used include water, organic solvents (for example, alcohols such as methanol, ketones such as acetone, amides such as formamide, sulfoxides such as dimethyl sulfoxide, esters such as ethyl acetate, ethers, and the like), and mixed solvents thereof.

Other than the materials, conventionally known various additives in a powdery, granular, or foil state, such as a surface lubricant, a leveling agent, an antioxidant, a corrosion inhibitor, a light stabilizer, an ultraviolet absorber, a polymerization inhibitor, a silane coupling agent, an inorganic or organic filler, a metal powder, and a pigment can be appropriately added to the composition according to the uses.

Examples of the method of applying the composition include a gravure coater method, a comma coater method, a bar coater method, a knife coater method, a die coater method, and a roll coater method.

Examples of the hardening treatment include a light hardening treatment and a thermal hardening treatment.

The light hardening treatment may consist of a plurality of hardening processes, and a light wavelength to be used may be appropriately selected from a plurality of wavelengths. A thermal hardening treatment may also consist of a plurality of hardening processes, and a method of providing heat may be selected from an appropriate method such as an oven, a reflow furnace, and an IR heater. Otherwise, a light hardening treatment and a thermal hardening treatment may be appropriately combined.

A light source to be used at the time of the light hardening treatment is not particularly limited, but examples thereof include a low pressure mercury lamp, a medium pressure mercury lamp, a high pressure mercury lamp, an ultra-high pressure mercury lamp, a xenon lamp, a metal halide lamp, and an electrodeless lamp. As the light to be used for the light hardening treatment, ultraviolet rays are preferable, and examples thereof include a general ultraviolet irradiation device, and specifically, a belt conveyer-type ultraviolet irradiation device is preferable.

The conditions at the time of the light hardening treatment can be appropriately selected according to the components of the composition to be used or the like. The irradiation dose (for example, ultraviolet ray irradiation dose) is preferably 100 mJ/cm$^2$ to 2,500 mJ/cm$^2$ and preferably 200 mJ/cm$^2$ to 1,100 mJ/cm$^2$.

A method of manufacturing a lower adhesive layer on a temporary support and thereafter transferring the lower adhesive layer on a peeling film can be used.

One of the preferable embodiments of the composition for forming the adhesive layer which is used in order to form the lower adhesive layer 14 includes the aforementioned composition including a (meth)acrylate monomer and a polymerization initiator. At least one type selected from the group consisting of a tacktifier and a rubber component may be included, if necessary. Polyfunctional (meth)acrylate or a crosslinking agent may be further included in the composition.

Definitions of the (meth)acrylate monomer, the polymerization initiator, the tacktifier, and the rubber component are as described above.

The content of the (meth)acrylate monomer in the composition for forming the adhesive layer is not particularly limited. In a case where a tacktifier and/or a rubber component is included in the composition for forming the adhesive layer, in view of excellently exhibiting the effect of the invention, the content thereof is preferably 10 mass % to 75 mass %, more preferably 15 mass % to 50 mass %, and even more preferably 20 mass % to 45 mass % with respect to the total solid content of the composition.

In a case where a tacktifier and a rubber component are not included in the composition for forming the adhesive layer, in view of excellently exhibiting the effect of the invention, the content thereof is preferably 75 mass % to 100 mass %, more preferably 85 mass % to 100 mass %, and even more preferably 90 mass % to 99 mass % with respect to the total solid content of the composition.

The content of the polymerization initiator in the composition for forming the adhesive layer is not particularly limited. In view of excellently exhibiting the effect of the invention, the content thereof is preferably 0.01 mass % to 5.0 mass % and more preferably 0.1 mass % to 4.0 mass % with respect to the total solid content of the composition.

The content of the tacktifier in the composition for forming the adhesive layer is not particularly limited, but the content is preferably 10 mass % to 60 mass % and more preferably 10 mass % to 50 mass % with respect to the total solid content of the composition.

The mass ratio of the tacktifier and the (meth)acrylate monomer in the composition for forming the adhesive layer is not particularly limited, but the mass ratio thereof is preferably 50 parts by mass to 320 parts by mass and more preferably 0 parts by mass to 270 parts by mass with respect to 100 parts by mass of the (meth)acrylate monomer.

The mass ratio of the rubber component and the (meth)acrylate monomer in the composition for forming the adhesive layer is not particularly limited, but the mass ratio thereof is preferably 5 parts by mass to 320 parts by mass and more preferably 5 parts by mass to 280 parts by mass with respect to 100 parts by mass of the (meth)acrylate monomer.

The solid content means components forming an adhesive layer (lower adhesive layer) and does not include a solvent or the like.

A polymerizable group may be included or not included in the rubber component included in the composition. In addition, as the polymerizable group, a known radical polymerizable group (vinyl group, (meth)acryloyl group, or the like) or a known cation polymerizable group (epoxy group or the like) is included.

Exemplary types of rubber components in the rubber components having polymerizable groups include the examples described above (for example, polyisoprene, polybutadiene, and the like). Exemplary types of the polymerizable groups include groups exemplified above.

The rubber components having polymerizable groups are not particularly limited. As polyisoprene (meth)acrylate, "UC-102" (molecular weight: 17,000) and "UC-203" (molecular weight: 35,000) manufactured by Kuraray Co., Ltd. can be exemplified, and as polybutadiene (meth)acrylate, "TEAI-1000" (molecular weight: 2,000), "TE-2000" (molecular weight: 2,500), and "EMA-3000" (molecular weight: 3,100) manufactured by Nippon Soda Co., Ltd. can be exemplified.

(Upper Adhesive Layer)

The upper adhesive layer 18 is a layer for securing adhesiveness between the capacitive touch panel sensor 16 described below and the protective substrate 20 described below.

The maximum value of tan σ of the upper adhesive layer 18 obtained from the temperature dependency evaluation test (Test 1) is 0.08 or less. Among these, since malfunction of the touch panel hardly occurs, the maximum value is preferably 0.06 or less, more preferably 0.04 or less, and even more preferably 0.02 or less. The lower limit is not particularly limited. The lower the lower limit is, the more preferable, and 0 is most preferable. However, the lower limit is 0.001 or greater in many cases.

In a case where the maximum value of tan σ of the upper adhesive layer 18 obtained from the temperature dependency evaluation test (Test 1) is greater than 0.08, the malfunction of the touch panel easily occurs.

The maximum value of tan σ of the upper adhesive layer 18 obtained from the temperature dependency evaluation test (Test 2) is 0.08 or less, and the preferable range thereof is the same as the preferable range of tan σ obtained from the temperature dependency evaluation test (Test 1).

In a case where the maximum value of tan σ of the upper adhesive layer 18 obtained from the temperature dependency evaluation test (Test 2) is greater than 0.08, the malfunction of the touch panel easily occurs.

The thickness of the upper adhesive layer 18 is not particularly limited, but the thickness is preferably 5 μm to 350 μm and more preferably 30 μm to 150 μm. If the thickness is in the range described above, desired transmittance of the visible light can be obtained and dealing is facilitated.

The upper adhesive layer 18 is preferably optically transparent. That is, a transparent adhesive layer is preferable. The expression "optically transparent" means that the total light transmittance is 85% or higher. The total light transmittance is preferably 90% or higher and more preferably 100%.

Types of material configuring the upper adhesive layer 18 are not particularly limited, as long as tan σ is in the range described above, and examples thereof include a material configuring the lower adhesive layer 14.

In view of excellently exhibiting the effect of the invention, it is preferable that the lower adhesive layer 14 and the upper adhesive layer 18 are formed with different materials. That is, this means that the material forming the lower adhesive layer 14 and the material forming the upper adhesive layer 18 are different types.

tan σ of the lower adhesive layer 14 at respective temperatures of every 20° C. from −40° C. to 80° C. which is obtained from the temperature dependency evaluation test (Test 1) is equal to or less than tan σ of the upper adhesive layer 18 at respective temperatures.

That is, tan σ (hereinafter, also referred to as tan σ (1U)) of the lower adhesive layer 14 at respective temperatures of every 20° C. from −40° C. to 80° C. which is obtained from the temperature dependency evaluation test (Test 1) and tan σ (hereinafter, also referred to as tan σ (1T)) of the upper adhesive layer 18 at respective temperatures of every 20° C. from −40° C. to 80° C. which are obtained from the temperature dependency evaluation test (Test 1) satisfy a relationship of Expression (1) at respective corresponding temperatures.

$$\tan \sigma(1U) \leq \tan \sigma(1T) \qquad \text{Expression (1):}$$

Specifically, this means that tan σ (tan σ (1U:−40° C.), tan σ (1U:−20° C.), tan σ (1U:0° C.), tan σ (1U:20° C.), tan σ (1U:40° C.), tan σ (1U:60° C.), and tan σ (1U:80° C.)) of the lower adhesive layer 14 and tan σ (tan σ (1T:−40° C.), tan σ (1T:−20° C.), tan σ (1T:0° C.), tan σ (1T:20° C.), tan σ (1T:40° C.), tan σ (1T:60° C.), and tan σ (1T:80° C.)) of the upper adhesive layer 18 which are measured at −40° C., −20° C., 0° C., 20° C., 40° C., 60° C., and 80° C. are compared with each other at the same temperature, and seven relationships below are satisfied.

$$\tan \sigma(1U:-40°\,C.) \leq \tan \sigma(1T:-40°\,C.) \qquad \text{Expression (1-1):}$$

$$\tan \sigma(1U:-20°\,C.) \leq \tan \sigma(1T:-20°\,C.) \qquad \text{Expression (1-2):}$$

$$\tan \sigma(1U:0°\,C.) \leq \tan \sigma(1T:0°\,C.) \qquad \text{Expression (1-3):}$$

$$\tan \sigma(1U:20°\,C.) \leq \tan \sigma(1T:20°\,C.) \qquad \text{Expression (1-4):}$$

$$\tan \sigma(1U:40°\,C.) \leq \tan \sigma(1T:40°\,C.) \qquad \text{Expression (1-5):}$$

$$\tan \sigma(1U:60°\,C.) \leq \tan \sigma(1T:60°\,C.) \qquad \text{Expression (1-6):}$$

$$\tan \sigma(1U:80°\,C.) \leq \tan \sigma(1T:80°\,C.) \qquad \text{Expression (1-7):}$$

tan σ (1U:° C.) (or tan σ (1T:° C.)) means a value of tan σ (1U) (or a value of tan σ (1T)) at each temperature.

Among these, in view of excellently exhibiting the effect of the invention, tan σ of the lower adhesive layer 14 at respective temperatures of every 20° C. from −40° C. to 80° C. which is obtained from the temperature dependency evaluation test (Test 1) is preferably smaller than tan σ of the upper adhesive layer 18 at the respective corresponding temperatures.

Figure 3:
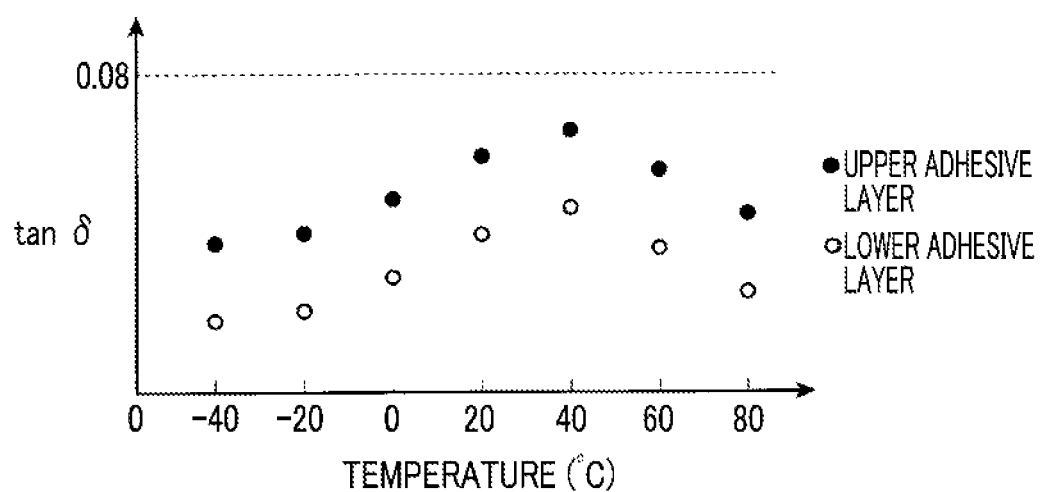
FIG. 3 is a diagram illustrating a relationship between tan σ of a lower adhesive layer and tan σ of an upper adhesive layer.

FIG. 3 shows an example of the relationship of Expression (1) above. The horizontal axis of FIG. 3 indicates a temperature and the vertical axis indicates tan σ. FIG. 3 is an example of measurement results of two types of adhesive layers. White circles indicate results of the lower adhesive layer, and black circles indicate results of the upper adhesive layer.

In FIG. 3, at respective temperatures, black circles indicate greater values than white circles. That is, at respective temperatures, tan σ of the lower adhesive layer is equal to or less than tan σ of the upper adhesive layer.

As illustrated in FIG. 3, the maximum value of tan σ of the lower adhesive layer and the maximum value of tan σ of the upper adhesive layer are 0.08 or less.

tan σ of the lower adhesive layer 14 at respective temperatures of every 20° C. from −40° C. to 80° C. which is obtained from the temperature dependency evaluation test (Test 2) is equal to or less than tan σ of the upper adhesive layer 18 at the respective corresponding temperatures.

That is, tan σ (hereinafter, also referred to as tan σ (2U)) of the lower adhesive layer 14 at respective temperatures of every 20° C. from −40° C. to 80° C. which is obtained from the temperature dependency evaluation test (Test 2) and tan σ (hereinafter, also referred to as tan σ (2T)) of the upper adhesive layer 18 at respective temperatures of every 20° C. from −40° C. to 80° C. which is obtained from the temperature dependency evaluation test (Test 2) satisfy a relationship of Expression (2) below at respective temperatures.

$$\tan \sigma(2U) \leq \tan \sigma(2T) \qquad \text{Expression (2):}$$

Specifically, tan σ (tan σ (2U:−40° C.), tan σ (2U:−20° C.), tan σ (2U:0° C.), tan σ (2U:20° C.), tan σ (2U:40° C.), tan σ (2U:60° C.), and tan σ (2U:80° C.)) of the lower adhesive layer 14 and tan σ (tan σ (2T:−40° C.), tan σ (2T:−20° C.), tan σ (2T:0° C.), tan σ (2T:20° C.), tan σ (2T:40° C.), tan σ (2T:60° C.), and tan σ (2T:80° C.)) of the upper adhesive layer 18 which are measured at −40° C., −20° C., 0° C., 20° C., 40° C., 60° C., and 80° C. are compared with each other at the same temperature, and seven relationships below are satisfied.

$$\tan \sigma(2U:-40°\,C.) \leq \tan \sigma(2T:-40°\,C.) \qquad \text{Expression (2-1):}$$

$$\tan \sigma(2U:-20°\,C.) \leq \tan \sigma(2T:-20°\,C.) \qquad \text{Expression (2-2):}$$

$$\tan \sigma(2U:0°\,C.) \leq \tan \sigma(2T:0°\,C.) \qquad \text{Expression (2-3):}$$

$$\tan \sigma(2U:20°\,C.) \leq \tan \sigma(2T:20°\,C.) \qquad \text{Expression (2-4):}$$

$$\tan \sigma(2U:40°\,C.) \leq \tan \sigma(2T:40°\,C.) \qquad \text{Expression (2-5):}$$

$$\tan \sigma(2U:60°\,C.) \leq \tan \sigma(2T:60°\,C.) \qquad \text{Expression (2-6):}$$

$$\tan \sigma(2U:80°\,C.) \leq \tan \sigma(2T:80°\,C.) \qquad \text{Expression (2-7):}$$

tan σ (2U:° C.) (or tan σ(2T:° C.)) means a value of tan σ(2U) (or a value of tan σ (2T)) at each temperature.

Among these, in view of excellently exhibiting the effect of the invention, tan σ of the lower adhesive layer 14 at respective temperatures of every 20° C. from −40° C. to 80° C. which is obtained from the temperature dependency evaluation test (Test 2) is preferably less than tan σ of the upper adhesive layer 18 at the respective corresponding temperatures.

(Display Device)

The display device 12 is a device having a display surface that displays an image, and respective members (for example, the lower adhesive layer 14) are disposed on the display surface side.

Types of the display device 12 are not particularly limited, but a known display device can be used. Examples thereof include a cathode ray tube (CRT) display device, a liquid crystal display device (LCD), an organic light emitting diode (OLED) display device, a vacuum fluorescent display (VFD), a plasma display panel (PDP), a surface-conduction electron-emitter display (SED), a field emission display (FED), or an electronic paper (E-Paper).

(Protective Substrate)

The protective substrate 20 is a substrate disposed on the upper adhesive layer 18 and fulfills roles of protecting the capacitive touch panel sensor 16 or the display device 12 described below, from the external environment and also the main surface thereof form a touch surface.

The protective substrate is preferably a transparent substrate, and a plastic film, a plastic plate, a glass plate, and the like can be used. It is desirable that the thickness of the substrate is appropriately selected depending on the respective uses.

As the raw material of the plastic film and the plastic plate, for example, polyesters such as polyethylene terephthalate (PET) and polyethylene naphthalate (PEN); polyolefins such as polyethylene (PE), polypropylene (PP), polystyrene, and EVA; vinyl-based resins; and other materials such as polycarbonate (PC), polyamide, polyimide, acrylic resins, triacetyl cellulose (TAC), and cycloolefin-based resins (COP) can be used.

A polarizing plate, a circularly polarizing plate, or the like may be used as the protective substrate 20.

(Capacitive Touch Panel Sensor)

The capacitive touch panel sensor 16 is a sensor which is disposed on the display device 12 (operator side) and detects a position of an external conductor such as a human finger using a change in the capacitance generated in a case where the external conductor such as a human finger is brought into contact with (brought close to) the sensor.

The configuration of the capacitive touch panel sensor 16 is not particularly limited, but in general, the capacitive touch panel sensor has detection electrodes (particularly, detection electrodes extending in X-direction and detection electrodes extending in Y-direction), and detects a change in the capacitance of the detection electrode brought into contact with or brought close to a finger to specify coordinates of the finger.

Using FIG. 4, a preferable aspect of the capacitive touch panel sensor 16 will be described in detail.

Figure 4:
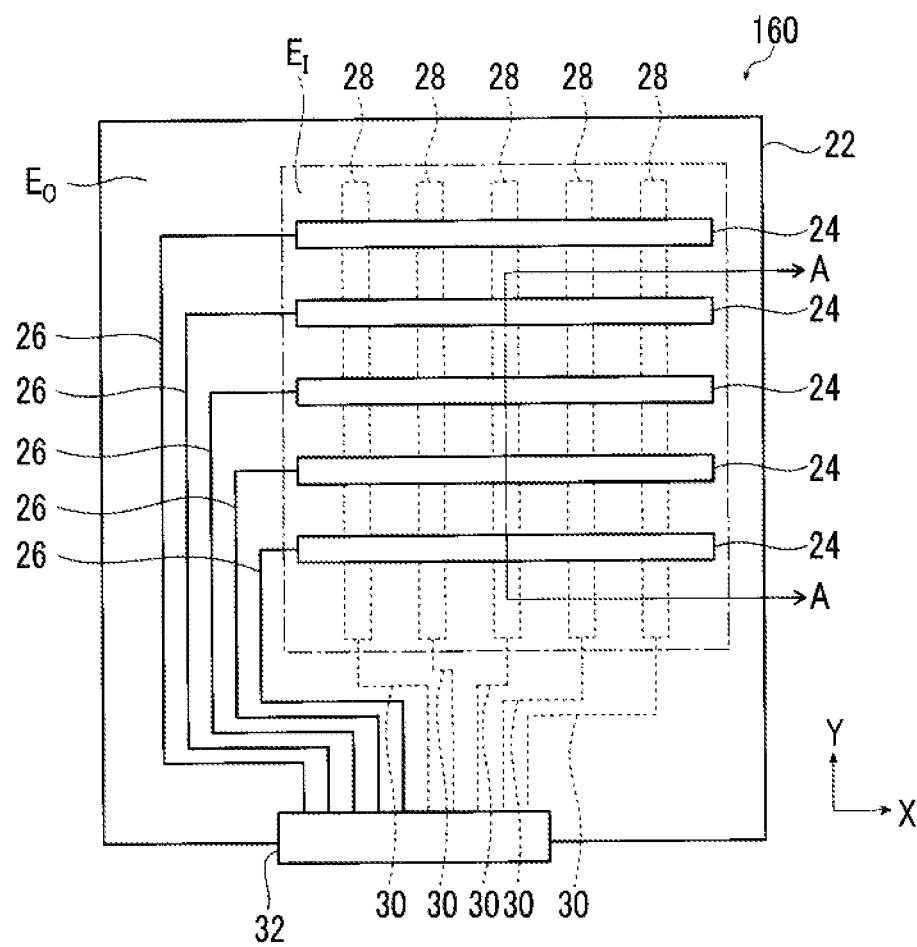
FIG. 4 is a plan view of an embodiment of the capacitive touch panel sensor.
Figure 5:
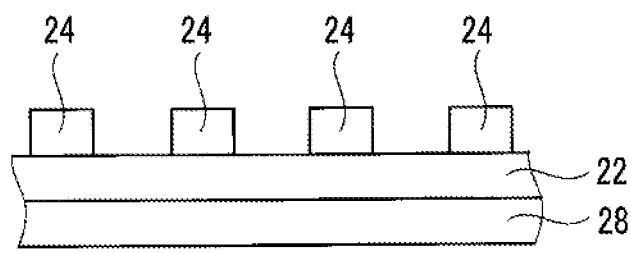
FIG. 5 is a cross-sectional view taken along cutting line A-A shown in FIG. 4.

FIG. 4 shows a plan view of a capacitive touch panel sensor 160. FIG. 5 is a cross-sectional view taken along cutting line A-A of FIG. 4. The capacitive touch panel sensor 160 comprises a substrate 22, first detection electrodes 24 which are disposed on one main surface (on front surface) of the substrate 22, first lead-out wiring portions 26, second detection electrodes 28 which are disposed on the other main surface (on rear surface) of the substrate 22, second lead-out wire portions 30, and a flexible printed wiring board 32. The region where the first detection electrodes 24 and the second detection electrodes 28 are formed constitutes an input region $E_I$ (input region (sensing portion) in which contact of object can be detected) where a user can perform an input operation, and in an outside region $E_O$ positioned on the outside of the input region $E_I$, the first lead-out wiring portions 26, the second lead-out wire portions 30, and the flexible printed wiring board 32 are disposed.

Hereinafter, the above configuration will be described in detail.

The substrate 22 is a member which acts to support the first detection electrodes 24 and the second detection electrodes 28 in the input region $E_I$ and acts to support the first lead-out wiring wirings 26 and the second lead-out wire wirings 30 in the outside region $E_O$.

The substrate 22 preferably appropriately transmits light. Specifically, the total light transmittance of the substrate 22 is preferably 85% to 100%.

The substrate 22 preferably has insulating properties (is insulating substrate). That is, the substrate 22 is a layer for securing insulating properties between the first detection electrodes 24 and the second detection electrodes 28.

The substrate 22 is preferably a transparent substrate (particularly, transparent insulating substrate). Specific examples thereof include an insulating resin substrate, a ceramic substrate, and a glass substrate. Among these, an insulating resin substrate is preferable due to excellent toughness.

Specific examples of the material of the insulating resin substrate include polyethylene terephthalate, polyether sulfone, a polyacrylic resin, a polyurethane-based resin, polyester, polycarbonate, polysulfone, polyamide, polyarylate, polyolefin, a cellulose-based resin, polyvinyl chloride, and a cycloolefin-based resin. Among these, polyethylene terephthalate, a cycloolefin-based resin, polycarbonate, and a triacetyl cellulose resin are preferable due to excellent transparency.

In FIG. 4, the substrate 22 is a single layer, but may be a multi-layer of two or more layers.

The thickness of the substrate 22 (when the substrate 22 is a multi-layer of two or more layers, total thickness of the layers) is not particularly limited, but is preferably 5 µm to 350 µm, and even more preferably 30 µm to 150 µm. When the thickness is within the range, a desired visible light transmittance is obtained, and handling is facilitated.

In FIG. 4, the substrate 22 substantially has a rectangular shape when viewed from the top, but the shape is not limited thereto. For examples, the shape may be a circular shape or a polygonal shape.

The first detection electrodes 24 and the second detection electrodes 28 are sensing electrodes which sense a change in the capacitance, and constitute a sensing portion (sensor portion). That is, when a fingertip is brought into contact with the touch panel, the mutual capacitance between the first detection electrode 24 and the second detection electrode 28 changes, and based on this change, the position of the fingertip is calculated by an IC circuit.

The first detection electrodes 24 act to detect an input position of a user's finger brought close to the input region $E_I$ in the X-direction, and have a function to generate a capacitance between the finger and the first detection electrode. The first detection electrodes 24 are electrodes which extend in a first direction (X-direction) and are arranged with predetermined intervals therebetween in a second direction (Y-direction) perpendicular to the first direction, and have a predetermined pattern as will be described later.

The second detection electrodes 28 act to detect an input position of a user's finger brought close to the input region $E_I$ in the Y-direction, and have a function to generate a capacitance between the finger and the second detection electrode. The second detection electrodes 28 are electrodes which extend in the second direction (Y-direction) and are arranged with predetermined intervals therebetween in the first direction (X-direction), and have a predetermined pattern as will be described later. In FIG. 4, five first detection electrodes 24 and five second detection electrodes 28 are provided. However, the number is not particularly limited, but may be more than one.

Figure 6:
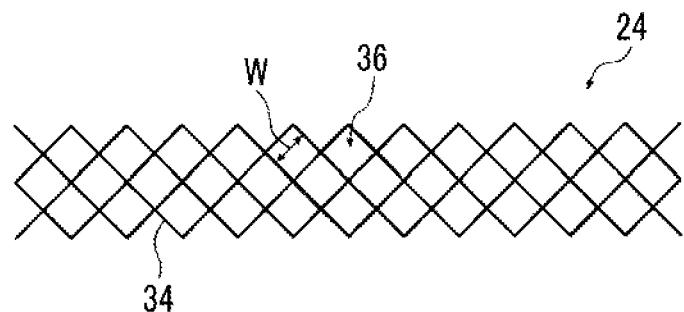
FIG. 6 is an enlarged plan view of a first detection electrode.

In FIG. 4, the first detection electrodes 24 and the second detection electrodes 28 are composed of fine conductive wires. FIG. 6 shows an enlarged plan view of a part of the first detection electrode 24. As shown in FIG. 6, the first detection electrodes 24 are composed of fine conductive wires 34 and include a plurality of lattices 36 formed by intersecting fine conductive wires 34. Similarly to the first detection electrodes 24, the second detection electrodes 28 also include a plurality of lattices 36 formed by intersecting fine conductive wires 34.

Examples of the material of the fine conductive wire 34 include metals such as gold (Au), silver (Ag), copper (Cr), aluminum (Al), and palladium (Pd) and alloys thereof (for example, a silver-palladium alloy, a silver-palladium-copper alloy), and metal oxides such as ITO, tin oxide, zinc oxide, cadmium oxide, gallium oxide, and titanium oxide. Among these, silver is preferable since the fine conductive wire 34 has excellent conductive properties.

The fine conductive wire 34 preferably contains a binder from the viewpoint of adhesiveness between the fine conductive wire 34 and the substrate 22.

As the binder, a water-soluble polymer is preferable since more excellent adhesiveness is obtained between the fine conductive wire 34 and the substrate 22. Examples of the type of the binder include polysaccharides such as gelatin, carrageenan, polyvinyl alcohol (PVA), polyvinylpyrrolidone (PVP), and starch, cellulose and derivatives thereof, polyethylene oxide, polysaccharide, polyvinylamine, chitosan, polylysine, polyacrylic acid, polyalginic acid, polyhyaluronic acid, carboxy cellulose, gum arabic, and sodium alginate. Among these, gelatin is preferable since more excellent adhesiveness is obtained between the fine conductive wire 34 and the substrate 22.

As the gelatin, acid-treated gelatin may be used other than lime-treated gelatin, and gelatin hydrolysate, an enzymatic decomposition product of gelatin, and gelatin modified with an amino group or a carboxyl group (phthalated gelatin or acetylated gelatin) can be used.

As the binder, a polymer (hereinafter, also simply referred to as polymer) different from the gelatin may be used with the gelatin.

The type of the polymer to be used is not particularly limited as long as it is different from the gelatin, but examples thereof include at least any one selected from the group consisting of an acrylic resin, a styrene-based resin, a vinyl-based resin, a polyolefin-based resin, a polyester-based resin, a polyurethane-based resin, a polyamide-based resin, a polycarbonate-based resin, a polydiene-based resin, an epoxy-based resin, a silicone-based resin, a cellulose-based polymer, and a chitosan-based polymer, and copolymers formed of monomers constituting these resins.

The volume ratio (volume of metal/volume of binder) of the metal and the binder in the fine conductive wire 34 is preferably 1.0 or higher, and even more preferably 1.5 or higher. When the volume ratio of the metal and the binder is 1.0 or higher, the conductive properties of the fine conductive wire 34 can be further increased. The upper limit is not particularly limited, but is preferably 6.0 or lower, even more preferably 4.0 or lower, and even more preferably 2.5 or lower from the viewpoint of productivity.

The volume ratio of the metal and the binder can be calculated from the densities of the metal and the binder contained in the fine conductive wire 34. For example, in a case where the metal is silver, the density of the silver is calculated to be 10.5 g/cm$^3$, and in a case where the binder is gelatin, the density of the gelatin is calculated to be 1.34 g/cm$^3$ to obtain the volume ratio.

The wire width of the fine conductive wire 34 is not particularly limited. However, from the viewpoint of relatively easily forming a low-resistance electrode, the wire width is preferably 30 µm or less, even more preferably 15 µm or less, even more preferably 10 µm or less, particularly preferably 9 µm or less, and most preferably 7 µm or less, and is preferably 0.5 µm or greater, and even more preferably 1.0 µm or greater.

The thickness of the fine conductive wire 34 is not particularly limited. However, from the viewpoint of conductive properties and visibility, the thickness can be selected within a range of 0.00001 mm to 0.2 mm, and is preferably 30 µm or less, even more preferably 20 µm or less, even more preferably 0.01 µm to 9 µm, and most preferably 0.05 µm to 5 µm.

The lattices 36 include opening regions surrounded by the fine conductive wires 34. A length W of one side of the lattice 36 is preferably 800 µm or less and even more preferably 600 µm or less, and still even more preferably 400 µm or less, preferably 5 µm or greater, even more preferably 30 µm or greater, and still even more preferably 80 µm or greater.

In the first detection electrodes 24 and the second detection electrodes 28, the opening ratio is preferably 85% or higher, even more preferably 90% or higher, and most preferably 95% or higher in view of the visible light transmittance. The opening ratio corresponds to a ratio of a transmissive portion excluding the fine conductive wires 34 in the first detection electrodes 24 or the second detection electrodes 28 in a predetermined region.

The lattices 36 have an almost diamond shape, but may have a polygonal shape (for example, triangular shape, quadrangular shape, hexagonal shape, or random polygonal shape) other than the diamond shape. In addition, one side may have a curved shape or an arc shape other than a linear shape. In the case of an arc shape, for example, two sides opposed to each other may have an outward convex arc shape, and other two sides opposed to each other may have an inward convex arc shape. In addition, each side may have a wave line shape in which outward convex arcs and inward convex arcs are continued. Needles to say, each side may have the shape of a sine curve.

In FIG. 6, the fine conductive wires 34 are formed in a mesh pattern, but are not limited to this aspect. The wires may be formed in a stripe pattern.

In FIG. 4, the first detection electrodes 24 and the second detection electrodes 28 are formed to have a mesh structure of the fine conductive wires 34, but the invention is not limited to this aspect. For example, all of the first detection electrodes 24 and the second detection electrodes 28 may be formed of a metal oxide thin film (transparent metal oxide thin film) such as ITO or ZnO. The fine conductive wires 34 of the first detection electrodes 24 and the second detection electrodes 28 may be formed of metal oxide particles, a metal paste such as a silver paste or a copper paste, or metal nanowire particles such as silver nanowire or copper nanowire. Among these, in view of excellent conductive properties and transparency, fine silver wires are preferable.

Patterning of the electrode can be selected according to the materials of the electrode, and a photolithography method, a resist mask screen printing-etching method, an inkjet method, a printing method, and the like may be used.

The first lead-out wirings 26 and the second lead-out wires 30 are members acting to apply a voltage to the first detection electrodes 24 and the second detection electrodes 28, respectively.

The first lead-out wiring 26 is disposed on the substrate 22 in the outside region $E_O$. One end thereof is electrically connected to the corresponding first detection electrode 24, and the other end is electrically connected to the flexible printed wiring hoard 32.

The second lead-out wiring 30 is disposed on the substrate 22 in the outside region $E_O$. One end thereof is electrically connected to the corresponding second detection electrode 28, and the other end is electrically connected to the flexible printed wiring board 32.

In FIG. 4, five first lead-out wirings 26 and five second lead-out wirings 30 are provided. However, the number is not particularly limited, and in general, a plurality of lead-out wires are disposed according to the number of detection electrodes.

Examples of the material of wirings for forming the first lead-out wiring 26 and the second lead-out wiring 30 include metals such as gold (Au), silver (Ag), and copper (Cr), and metal oxides such as tin oxide, zinc oxide, cadmium oxide, gallium oxide, and titanium oxide. Among these, silver is preferable since excellent conductive properties are obtained. In addition, metal pastes such as a silver paste and a copper paste, and metal or alloy thin films such as aluminum (Al), molybdenium (Mo), and palladium (Pd) may be used to form the lead-out wires. In the case of a metal paste, a screen printing or ink jet printing method is preferably used, and in the case of a metal or alloy thin film, a patterning method such as a photolithographic method is preferably used.

The first lead-out wiring 26 and the second lead-out wiring 30 preferably contain a binder in view of more excellent adhesiveness with the substrate 22. The type of the binder is as described above.

The flexible printed wiring board 32 is a plate having a plurality of wires and terminals provided on a substrate, and is connected to the other end of each first lead-out wiring 26 and the other end of each second lead-out wiring 30 to act to connect the capacitive touch panel sensor 160 and an external device (for example, display device).

As the size of the input region of the capacitive touch panel sensor in which the contact of the object can be detected increases in the diagonal direction, the number of operation wires (the number of detection electrodes) increases. Therefore, time required for scanning a portion near the wires has to be compressed. In order to maintain a sensing environment appropriate for mobile use, an object of the invention is to reduce parasitic capacitance and a temperature change amount of a capacitive touch panel sensor. As the size increases on the adhesive layer in the related art, there has been a concern in that a sensing program may not follow the input region (malfunction occurs). Meanwhile, in a case where an adhesive layer indicating predetermined tan σ is used as in the invention, as the size of the input region (sensing part) of the capacitive touch panel sensor in which the contact of the object can be detected in the diagonal direction is greater than 5 inches, an appropriate sensing environment can be obtained. If the size is more preferably 8 inches or greater and still more preferably 10 inches or greater, it is possible to exhibit an excellent effect in the prevention of the malfunction. The input region having the above size has a rectangular shape.

(Method of Manufacturing Capacitive Touch Panel Sensor)

The method of manufacturing the capacitive touch panel sensor 160 is not particularly limited, and a known method can be employed. For example, a method in which a photo resist film on metal foil formed on both main surfaces of the substrate 22 is subjected to an exposure and development treatment to form a resist pattern, and the metal foil exposed from the resist pattern is subjected to etching is exemplified. In addition, a method in which a paste containing fine metal particles or metal nano-wires is printed on both main surfaces of the substrate 22, and the paste is subjected to metal plating is exemplified. A forming method including printing using a screen printing plate or a gravure printing plate on the substrate 22, or an ink jet forming method is also exemplified.

Other than the above methods, a method using halogenated silver is also exemplified. Specifically, a method including a process (1) of forming a halogenated silver emulsion layer (hereinafter, also simply referred to as photosensitive layer) containing halogenated silver and a binder on both surfaces of the substrate 22, and a process (2) of subjecting the photosensitive layer to a development treatment after exposure is exemplified.

Hereinafter, the processes will be described.

[Process (1): Photosensitive Layer Forming Process]

The process (1) is a process of forming a photosensitive layer containing halogenated silver and a binder on both surfaces of the substrate 22.

The method of forming a photosensitive layer is not particularly limited. However, from the viewpoint of productivity, a method of forming a photosensitive layer on both surfaces of the substrate 22 by bringing a photosensitive layer forming composition containing halogenated silver and a binder into contact with the substrate 22 is preferable.

Hereinafter, an aspect of the photosensitive layer forming composition used in the method will be described in detail, and then the procedures of the process will be described in detail.

The photosensitive layer forming composition contains halogenated silver and a binder.

The halogen element contained in the halogenated silver may be any one of chlorine, bromine, iodine, and fluorine, or a mixture thereof. As the halogenated silver, for example, halogenated silver mainly containing silver chloride, silver bromide, or silver iodide is preferably used, and halogenated silver mainly containing silver bromide or silver chloride is even more preferably used.

The type of the binder to be used is as described above. The binder may be contained in a latex form in the photosensitive layer forming composition.

The volume ratio of the halogenated silver and the binder contained in the photosensitive layer forming composition is not particularly limited, and is appropriately adjusted to be within the above-described range of the preferable volume ratio of the metal and the binder in the fine conductive wire 34.

If necessary, the photosensitive layer forming composition contains a solvent.

Examples of the solvent to be used include water, organic solvents (for example, alcohols such as methanol, ketones such as acetone, amides such as formamide, sulfoxides such as dimethyl sulfoxide, esters such as ethyl acetate, ethers, and the like), ionic liquid, and mixed solvents thereof.

The content of the solvent to be used is not particularly limited, but is preferably within a range of 30 mass % to 90 mass %, and even more preferably within a range of 50 mass % to 80 mass % with respect to the total mass of the halogenated silver and the binder.

(Procedures of Process)

The method of bringing the photosensitive layer forming composition into contact with the substrate 22 is not particularly limited, and a known method can be employed. Examples thereof include a method of applying the photosensitive layer forming composition to the substrate 22, and a method of dipping the substrate 22 in the photosensitive layer forming composition.

The content of the binder in the photosensitive layer to be formed is not particularly limited, but is preferably 0.3 g/m$^2$ to 5.0 g/m$^2$, and even more preferably 0.5 g/m$^2$ to 2.0 g/m$^2$.

The content of the halogenated silver in the photosensitive layer is not particularly limited, but is preferably 1.0 g/m$^2$ to 20.0 g/m$^2$, and even more preferably 5.0 g/m$^2$ to 15.0 g/m$^2$ in terms of silver in view of more excellent conductive characteristics of the fine conductive wire 34.

If necessary, a protective layer formed of a binder may be further provided on the photosensitive layer. By providing the protective layer, scratches are prevented from being formed and mechanical characteristics are improved.

[Process (2): Exposure and Development Process]

The process (2) is a process of forming the first detection electrodes 24 and the first lead-out wirings 26, and forming the second detection electrodes 28 and the second lead-out wirings 30 by subjecting the photosensitive layer obtained in the process (1) to pattern exposure, and by then performing a development treatment thereon.

First, hereinafter, the pattern exposure treatment will be described in detail, and then the development treatment will be described in detail.

(Pattern Exposure)

The halogenated silver in the photosensitive layer in an exposure region forms a latent image by subjecting the photosensitive layer to pattern exposure. In the region where the latent image is formed, detection electrodes and leading-out wirings are formed by the development treatment to be described later. In an unexposed region where the exposure is not performed, the halogenated silver is dissolved and flows out from the photosensitive layer in a fixing treatment to be described later, and a transparent film is obtained.

The light source used during the exposure is not particularly limited, and examples thereof include light such as visible light rays and ultraviolet rays, and radiation such as X-rays.

The method of performing the pattern exposure is not particularly limited. For example, surface exposure using a photomask, or scanning exposure using laser beams may be performed. The shape of the pattern is not particularly limited, and can be appropriately adjusted according to a fine conductive wire pattern to be formed.

(Development Treatment)

The development treatment method is not particularly limited, and a known method can be employed. For example, a usual development treatment technology which is used in a silver salt photographic film, printing paper, a film for printing plate making, an emulsion mask for photomasks, and the like can be used.

The type of a developer used in the development treatment is not particularly limited, but for example, a PQ developer, a MQ developer, a MAA developer, or the like can be used. In commercially available products, developers such as CN-16, CR-56, CP45X, FD-3, and PAPITOL available from Fujifilm Corporation and C-41, E-6, RA-4, D-19, and D-72 available from Eastman Kodak Company, or developers contained in kits thereof can be used. A lith developer can also be used.

The development treatment may include a fixing treatment which is performed for stabilization by removing the silver salt of the unexposed portion. For the fixing treatment, a fixing treatment technology which is used in a silver salt photographic film, printing paper, a film for printing plate making, an emulsion mask for photomasks, and the like can be used.

The fixing temperature in the fixing process is preferably about 20° C. to about 50° C., and even more preferably 25° C. to 45° C. The fixing time is preferably 5 seconds to 1 minute, and even more preferably 7 seconds to 50 seconds.

The mass of the metal silver contained in the exposed portion (detection electrode and leading-out wirings) after the development treatment is preferably 50 mass % or higher, and even more preferably 80 mass % or higher with respect to the mass of the silver contained in the exposed portion before the exposure. The mass of the silver contained in the exposed portion is preferably 50 mass % or higher with respect to the mass of the silver contained in the exposed portion before the exposure since high conductive properties can be obtained.

If necessary, the following undercoat layer forming process, antihalation layer forming process, or heating treatment may be performed other than the processes.

(Undercoat Layer Forming Process)

Before the process (1), a process of forming an undercoat layer containing the binder on both surfaces of the substrate 22 is preferably performed since excellent adhesiveness is obtained between the substrate 22 and the halogenated silver emulsion layer.

The binder to be used is as described above. The thickness of the undercoat layer is not particularly limited, but is preferably 0.01 μm to 0.5 μm, and even more preferably 0.01 μm to 0.1 μm in view of adhesiveness and further suppression of the rate of change of the mutual capacitance.

(Antihalation Layer Forming Process)

A process of forming an antihalation layer on both surfaces of the substrate 22 is preferably performed before the process (1) from the viewpoint of thinning of the fine conductive wires 34.

(Process (3): Heating Process)

A process (3) is a process of performing a heating treatment after the development treatment and may be performed, if necessary. By performing this process, fusion occurs between binders, and thus the hardness of the detection electrodes and the leading-out wirings further increases. Particularly, in a case where polymer particles are dispersed as a binder in the photosensitive layer forming composition (in a case where polymer particles in latex correspond to a binder), fusion occurs between polymer particles by performing this process, and thus the detection electrodes and the leading-out wirings exhibiting desired hardness are formed.

Regarding conditions of the heating treatment, preferable conditions are appropriately selected according to the binder to be used, but from the viewpoint of the film forming temperature of the polymer particles, 40° C. or higher is preferable, 50° C. or higher is more preferable, and 60° C. or higher is even more preferable. From the viewpoint of suppression of a curl of the substrate, 150° C. or lower is preferable, and 100° C. or lower is more preferable.

The heating time is not particularly limited, but is preferably 1 minute to 5 minutes, and even more preferably 1 minute to 3 minutes from the viewpoint of productivity and suppression of a curl of the substrate.

In general, the heating treatment can also be performed as a drying process to be performed after the exposure and development treatment, and this is excellent from the viewpoint of productivity and cost since there is no need to add a new process to form a film of the polymer particles.

By performing the process, a light transmissive portion containing the binder is formed between the detection electrodes (the fine conductive wires 34) and between leading-out wirings. Regarding the transmittance in the light transmissive portion, the transmittance indicated by a minimum value of the transmittance in a wavelength region of 380 nm to 780 nm is 90% or higher, preferably 95% or higher, even more preferably 97% or higher, still even more preferably 98% or higher, and most preferably 99% or higher.

The light transmissive portion may contain a material other than the binder. Examples of the material include a silver-hardly-soluble agent.

The aspect of the capacitive touch panel sensor is not limited to the aspect of FIG. 4, and the capacitive touch panel sensor may have other aspects.

Figure 7:
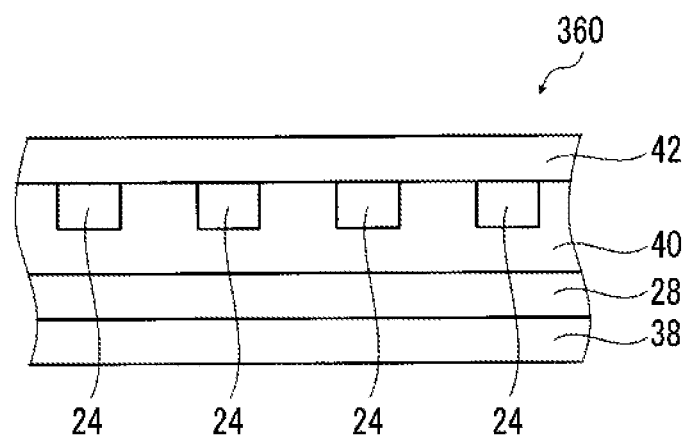
FIG. 7 is a partial cross-section of another embodiment of the capacitive touch panel sensor.

For example, as shown in FIG. 7, a capacitive touch panel sensor 260 comprises a first substrate 38, second detection electrodes 28 which are disposed on the first substrate 38, second lead-out wirings (not shown), each of which is electrically connected to one end of the second detection electrode 28 and is disposed on the first substrate 38, an adhesive layer 40, first detection electrodes 24, first lead-out wirings (not shown), each of which is electrically connected to one end of the first detection electrode 24, a second substrate 42 to which the first detection electrodes 24 and the first lead-out wirings are adjacent, and a flexible printed wiring board (not shown).

As shown in FIG. 7, since the capacitive touch panel sensor 260 has a configuration similar to that of the capacitive touch panel sensor 160, except for the first substrate 38, the second substrate 42, and the adhesive layer 40, the same constituent elements will be denoted by the same references, and descriptions thereof will be omitted.

The definition of the first substrate 38 and the second substrate 42 is the same as that of the above-described substrate 22.

The adhesive layer 40 is a layer for bringing the first detection electrodes 24 and the second detection electrodes 28 into close contact with each other, and is preferably optically transparent (is preferably a transparent adhesive layer). A known material is used as a material of the adhesive layer 40, and the same materials as the upper adhesive layer and the lower adhesive layer may be used.

The number of each of the first detection electrode 24 and the second detection electrode 28 in FIG. 7 is more than one as shown in FIG. 4, and both of them are disposed to be perpendicular to each other as shown in FIG. 4.

The capacitive touch panel sensor 260 shown in FIG. 7 corresponds to a capacitive touch panel sensor which has two substrates with electrodes attached thereto, each substrate with electrodes attached thereto having a substrate, and detection electrodes and lead-out wires disposed on a surface of the substrate, and is obtained by sticking the substrates to each other via an adhesive layer so that the electrodes face to each other.

Figure 8:
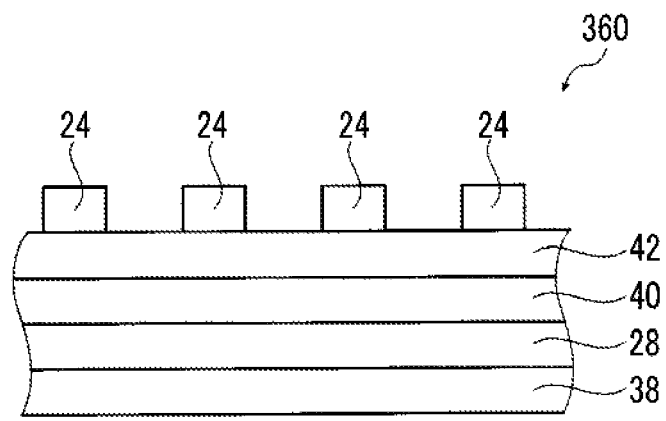
FIG. 8 is a partial cross-section of another embodiment of the capacitive touch panel sensor.

An aspect shown in FIG. 8 is exemplified as another aspect of the capacitive touch panel sensor.

A capacitive touch panel sensor 360 comprises a first substrate 38, second detection electrodes 28 which are disposed on the first substrate 38, second lead-out wirings (not shown), each of which is electrically connected to one end of the second detection electrode 28 and is disposed on the first substrate 38, an adhesive layer 40, a second substrate 42, first detection electrodes 24 which are disposed on the second substrate 42, first lead-out wirings (not shown), each of which is electrically connected to one end of the first detection electrode 24 and is disposed on the second substrate 42, and a flexible printed wiring board (not shown).

Since the capacitive touch panel sensor 360 shown in FIG. 8 has layers similar to those of the capacitive touch panel sensor 260 shown in FIG. 7, except that the order of the layers is different, the same constituent elements will be denoted by the same references, and descriptions thereof will be omitted.

The number of each of the first detection electrode 24 and the second detection electrode 28 in FIG. 8 is more than one as shown in FIG. 4, and both of them are disposed to be perpendicular to each other as shown in FIG. 4.

The capacitive touch panel sensor 360 shown in FIG. 8 corresponds to a capacitive touch panel sensor which has two substrates with electrodes attached thereto, each substrate with electrodes attached thereto having a substrate, and detection electrodes and lead-out wires disposed on a surface of the substrate, and is obtained by sticking the substrates to each other via an adhesive layer so that the substrate of one substrate with electrodes attached thereto and the electrodes of the other substrate with electrodes attached thereto face to each other.

(Method of Manufacturing Touch Panel)

The method of manufacturing the capacitive touch panel 10 above is not particularly limited, and known methods can be employed.

First, examples of the method of forming the upper adhesive layer 18 in the capacitive touch panel sensor 16 include a method of sticking an adhesive layer sheet (so-called transparent adhesive film (OCA: optically clear adhesive Film)) on the capacitive touch panel sensor 16 and a method of coating the capacitive touch panel sensor 16 with the liquid composition for forming the adhesive layer (so-called UV hardening-type adhesive agent or transparent adhesive agent (OCR: optically clear adhesive resin)) and performing a hardening treatment, if necessary. The adhesive layer sheet and the composition for forming the adhesive layer to be used are not particularly limited, as long as the upper adhesive layer 18 satisfies the characteristics described above.

Subsequently, the capacitive touch panel sensor 16 is stuck on the protective substrate 20. As the sticking method, known methods can be employed.

Subsequently, a method of forming the upper adhesive layer 18 can be used as a method of forming the lower adhesive layer 14 on the capacitive touch panel sensor 16.

Subsequently, a desired touch panel can be manufactured by sticking the display device 12 on the lower adhesive layer 14.

The method of forming respective layers from the capacitive touch panel sensor 16 is described above, but the invention is not limited thereto. For example, a desired touch panel can be manufactured, by first preparing a laminate A comprising the capacitive touch panel sensor 16, the lower adhesive layer 14, and the display device 12, separately preparing a laminate B comprising the protective substrate 20 and the upper adhesive layer 18, and sticking the laminate A and the laminate B.

A pressurizing and defoaming treatment and sticking under vacuum environment can be appropriately performed.

Malfunction hardly occurs in the capacitive touch panel according to the invention in a wide range of use environment from a low temperature to a high temperature as described above.

The size of the capacitive touch panel is not particularly limited. However, according to the demand for increase in the size of a screen, the size of the display device on the display surface in the diagonal direction is preferably 5 inches or greater and more preferably 10 inches or greater. In the capacitive touch panel according to the invention, malfunction hardly occurs even in the size described above. In general, according to the size of the display image in the diagonal direction, the size of the input region of the capacitive touch panel sensor in which the contact of the object can be detected in the diagonal direction changes. The input region having the above size has a rectangular shape.

Particularly, even in a case where the display surface is large (in a case where the size in the diagonal direction is 5 inches or greater), malfunction caused by the change of the environment hardly occurs in the capacitive touch panel according to the invention. Generally, if the size of the display surface increases, driving frequency (number of times of scanning) increases or electrostatic capacitance decreases, and, as a result, parasitic capacitance of the adhesive layer increases, and thus malfunction easily occurs. However, in the capacitive touch panel of the invention, even in a case where the display surface is large, deviation from the value of the initially determined electrostatic capacitance is small, and malfunction hardly occurs.

EXAMPLES

Hereinafter, the invention will be described in more detail with examples, but is not limited thereto.

Synthesis Example 1

Preparing of Adhesive Agent 1

UC-1 (polyisoprene methacrylate oligomer, molecular weight: 25,000) (22.7 parts by mass) and QM657 (dicyclopentenyloxyethyl methacrylate) (22.7 parts by mass), HOB (2-hydroxybutyl methacrylate) (1.7 parts by mass), POLYOIL 110 (liquid polybutadiene) (35.5 parts by mass), L-LIR (liquid polyisoprene) (14.2 parts by mass), LUCIRIN TPO (2,4,6-trimethylbenzoylphenyl ethoxy phosphine oxide) (1.1 parts by mass), IRGACURE 184 (1-hydroxy-cyclohexyl-phenyl-ketone) (1.7 parts by mass), KARENZ PE-01 (pentaerythritol tetrakis(3-mercaptobutyrate)) (0.3 parts by mass), and TINUVIN 123 (sebacic acid, bis[1-(octyloxy)-2,2,6,6-tetramethyl-4-piperidinyl]) (0.56 parts by mass) were blended in a predetermined amount (in terms of mass), so as to prepare the adhesive agent 1.

Synthesis Example 2

The Adhesive Agent 2

40 parts by mass of an esterified product of a maleic anhydride adduct and 2-hydroxyethyl methacrylate (Product name: UC102, manufactured by Kuraray Co., Ltd., molecular weight: 12,500) of the polyisoprene polymer, 35 parts by mass of dicyclopentenyloxyethyl methacrylate (Product name: FA512M, manufactured by Hitachi Chemical Co., Ltd.), 3 parts by mass of 2-hydroxypropyl methacrylate (Product name: LIGHTESTER HOP, manufactured by Kyoeisha Chemical Co., Ltd.), 3 parts by mass of acrylomorpholine (Product name: ACMO, manufactured by Kohjin Film & Chemicals Co., Ltd.), 15 parts by mass of benzyl acrylate (Product name: VISCOAT #160, manufactured by Osaka Organic Chemical Industry Ltd.), 35 parts by mass of a terpene-based hydrogenated resin (Product name: CLEARON P-85, manufactured by Yasuhara Chemical Co., Ltd.), 120 parts by mass of a butadiene polymer (Product name: POLYOIL 110, manufactured by ZEON Corporation), 0.3 parts by mass of a hindered phenol-based antioxidant (Product name: IRGANOX 1520L, manufactured by Ciba Specialty Chemicals), 0.5 parts by mass of a photopolymerization initiator (Product name: SPEEDCURE TPO, manufactured by DKSH Japan K.K.), and 4 parts by mass of a photopolymerization initiator (Product name: IRGACURE 184D, manufactured by Ciba Specialty Chemicals) were kneaded by a kneader, so as to prepare an adhesive agent 2.

Synthesis Example 3

Adhesive Agent 3

2-Ethylhexyl acrylate (29.5 parts by mass), 2-Hydroxyethyl acrylate (1.0 part by mass), isobornyl acrylate (63 parts by mass), dodecyl acrylate (4.9 parts by mass), an isophorone diisocyanate adduct product (trimethylolpropane reactant of isophorone diisocyanate, manufactured by Mitsui Chemicals, Inc., Product name: TAKENATE D-140N) (0.8 parts by mass), and IRGACURE 184 (manufactured by BASF SE) (0.6 parts by mass) were mixed, so as to obtain a solution.

A release PET (polyethylene terephthalate) film was coated with the obtained solution, and a release surface of the release PET film was stuck on the coating liquid. A high pressure mercury UV lamp light (DEEP UV lamp UXM-501MD, manufactured by Ushio Inc.) was used, a sample interposed with the release PET films was irradiated with UV light such that irradiation energy became 3 J/cm$^2$, and further thermal hardening was performed at 40° C. for 3 days, so as to obtain an adhesive agent 3 (transfer-type adhesive sheet).

Synthesis Example 4

Adhesive Agent 4

2-ethylhexyl acrylate (29.5 parts by mass), hexamethylene diacrylate (1.0 part by mass), isobornyl acrylate (62.0 parts by mass), dodecyl acrylate (4.9 parts by mass), hydroxyethyl acrylate (1.0 part by mass), an isophorone diisocyanate adduct product (a trimethylolpropane reactant of isophorone diisocyanate, manufactured by Mitsui Chemicals, Inc., Product name: TAKENATE D-140N) (1.0 part by mass), and IRGACURE 184 (manufactured by BASF SE) (0.6 parts by mass) were mixed, so as to obtain a solution.

A release PET film was coated with the obtained solution, and a release surface of the release PET film was stuck on the coating liquid. A high pressure mercury UV lamp light (DEEP UV lamp UXM-501MD, manufactured by Ushio Inc.) was used, a sample interposed with the release PET films was irradiated with UV light such that irradiation energy became 3 J/cm$^2$, and further thermal hardening was performed at 40° C. for 3 days, so as to obtain an adhesive agent 4 (transfer-type adhesive sheet).

Synthesis Example 5

Adhesive Agent 5

2-ethylhexyl acrylate (47 parts by mass), isobornyl acrylate (93 parts by mass), dodecyl acrylate (14 parts by mass), hydroxyethyl acrylate (1.6 parts by mass), and ethyl acetate (127 parts by mass) were mixed, and oxygen was removed in the system by perform stirring at 90° C. for 15 minutes, under a nitrogen gas stream. Subsequently, azobisisobutyronitrile (0.04 parts by mass) was added, and stirring was performed at 90° C. for 3 hours. Further, azobisisobutyronitrile (0.04 parts by mass) and ethyl acetate (132 parts by mass) were added, stirring was performed at 90° C. for 2 hours, so as to obtain an acryl polymer solution.

An isophorone diisocyanate adduct product (trimethylolpropane reactant of isophorone diisocyanate, manufactured by Mitsui Chemicals, Inc., Product name: TAKENATE D-140N) (0.08 parts by mass) was added to the obtained acryl polymer solution (10 parts by mass), and stirring was efficiently performed. Subsequently, the release PET film was coated with the acryl polymer solution, heating was performed at 100° C. for 3 minutes, and the solvent was removed. Thereafter, the upper surface was laminated with the release PET film and was left at 40° C. for 3 days, so as to obtain an adhesive agent 5 (transfer-type adhesive sheet).

Synthesis Example 6

Adhesive Agent 6

2-ethylhexyl acrylate (47.2 parts by mass), isobornyl acrylate (42.3 parts by mass), 2-hydroxyethyl acrylate (1.0 part by mass), dodecyl acrylate (7.9 parts by mass), an isophorone diisocyanate adduct product (trimethylolpropane reactant of isophorone diisocyanate, manufactured by Mitsui Chemicals, Inc., Product name: TAKENATE D-140N) (1.0 part by mass), and IRGACURE 184 (manufactured by BASF SE) (0.6 parts by mass) were mixed, so as to obtain the solution.

A release PET film was coated with the obtained solution, and a release surface of the release PET film was stuck on the coating liquid. A high pressure mercury UV lamp light (DEEP UV lamp UXM-501MD, manufactured by Ushio Inc.) was used, a sample interposed with the release PET films was irradiated with UV light such that irradiation energy became 3 J/cm$^2$, and further thermal hardening was performed at 40° C. for 3 days, so as to obtain an adhesive agent 6 (transfer-type adhesive sheet).

Synthesis Example 7

Adhesive Agent 7

2-Ethylhexyl acrylate (46.2 parts by mass), isobornyl acrylate (42.3 parts by mass), hexamethylene diacrylate (1.0 part by mass), dodecyl acrylate (7.9 parts by mass), hydroxyethyl acrylate (1.0 part by mass), an isophorone diisocyanate adduct product (trimethylolpropane reactant of isophorone diisocyanate, manufactured by Mitsui Chemicals, Inc., Product name: TAKENATE D-140N) (1 part by mass), and IRGACURE 184 (manufactured by BASF SE) (0.6 parts by mass) were mixed, so as to obtain a solution.

A release PET film was coated with the obtained solution, and a release surface of the release PET film was stuck on the coating liquid. A high pressure mercury UV lamp light (DEEP UV lamp UXM-501MD, manufactured by Ushio Inc.) was used, a sample interposed with the release PET films was irradiated with UV light such that irradiation energy became 3 J/cm$^2$, further thermal hardening was performed at 40° C. for 3 days, so as to obtain an adhesive agent 7 (transfer-type adhesive sheet).

Synthesis Example 8

Adhesive Agent 8

2-Ethylhexyl acrylate (70 parts by mass), isobornyl acrylate (70 parts by mass), dodecyl acrylate (14 parts by mass), hydroxyethyl acrylate (1.6 parts by mass), and ethyl acetate (127 parts by mass) were mixed, and oxygen was removed in the system by perform stirring at 90° C. for 15 minutes, under a nitrogen gas stream. Subsequently, azobisisobutyronitrile (0.04 parts by mass) was added, and stirring was performed at 90° C. for 3 hours. Further, azobisisobutyronitrile (0.04 parts by mass) and ethyl acetate (132 parts by mass) were added, stirring was performed at 90° C. for 2 hours, so as to obtain an acryl polymer solution.

An isophorone diisocyanate adduct product (trimethylolpropane reactant of isophorone diisocyanate, manufactured by Mitsui Chemicals, Inc., Product name: TAKENATE D-140N) (0.080 parts by mass) was added to the obtained acryl polymer solution (10 parts by mass), and stirring was efficiently performed. Subsequently, the release PET film was coated with the acryl polymer solution, heating was performed at 100° C. for 3 minutes, and the solvent was removed. Thereafter, the upper surface was laminated with the release PET film and was left at 40° C. for 3 days, so as to obtain an adhesive agent 8 (transfer-type adhesive sheet).

Synthesis Example 9

Adhesive Agent 9

21.8 parts by mass of an esterified product of a maleic anhydride adduct of a polyisoprene polymer and 2-hydroxyethyl methacrylate (Product name: UC203, manufactured by Kuraray Co., Ltd., molecular weight: 36,000), 11.4 parts by mass of polybutadiene (Product name: POLUVEST 110, manufactured by Evonik Industries AG), 5 parts by mass of dicyclopentenyloxyethyl methacrylate (Product name FA512M, manufactured by Hitachi Chemical Co., Ltd.), 20 parts by mass of 2-ethylhexyl methacrylate (manufactured by Wako Pure Chemical Industries, Ltd.), 38.8 parts by mass of a terpene-based hydrogenated resin (Product name: CLEARON P-135, Yasuhara Chemical Co., Ltd.) were kneaded with a kneader in a thermostatic tank of 130° C., and subsequently the temperature of the thermostatic tank was adjusted to 80° C. adjusted, and 0.6 parts by mass of a photopolymerization initiator (Product name: LUCIRIN TPO, manufactured by BASF SE) and 2.4 parts by mass of a photopolymerization initiator (Product name: IRGACURE 184, manufactured by BASF SE) were put into and kneaded with a kneader, so as to prepare the adhesive agent 9.

Synthesis Example 10

Adhesive Agent 10

An acryl copolymer of a monomer including acrylic acid ester having an ultraviolet crosslinkable portion was synthesized. A solution was prepared such that BA (n-butyl acrylate)/IBXA (isobornyl acrylate)/HEA (2-hydroxyethyl acrylate)/AEBP (4-acryloyloxyethoxy benzophenone) =50.0/25.0/25.0/0.20 (parts by mass) was satisfied and diluted with methyl ethyl ketone (MEK) such that the monomer concentration became 40 mass %. As an initiator, V-65 was added to a monomer component so as to be 0.4 mass %, and nitrogen purge was performed for 10 minutes. Subsequently, reaction was performed for 24 hours in a thermostatic tank of 50° C., so as to obtain a transparent viscous solution.

Subsequently, a peeling film (strongly releasable surface of CERAPEEL MIB (T) manufactured by Toray Advanced Film Co., Ltd.) having a thickness of 50 µm was coated with this polymerization solution, with a gap of a knife coater adjusted to 120 µm, and drying was performed in an oven of 100° C. for 8 minutes. The thickness of the adhesive agent after drying was 30 µm. Subsequently, a peeling film (PUREX (Registered trademark) A-31 manufactured by Teijin DuPont Films) having a thickness of 38 µm was laminated on the adhesive surface, so as to obtain the adhesive agent 10 (transfer-type adhesive sheet).

Synthesis Example 11

Adhesive Agent 11

2-ethylhexyl acrylate (49.0 parts by mass), isobornyl acrylate (29.0 parts by mass), 2-hydroxyethyl acrylate (19.0 parts by mass), IRGACURE 819 (manufactured by BASF SE) (2.0 parts by mass), and LUCIRIN TPO (manufactured by BASF SE) (1.0 part by mass) were mixed, so as to obtain a solution.

A release PET film was coated with the obtained solution, and a release surface of the release PET film was stuck on the coating liquid. A high pressure mercury UV lamp light (DEEP UV lamp UXM-501MD, manufactured by Ushio Inc.) was used, a sample interposed with the release PET films was irradiated with UV light such that irradiation energy became 3 J/cm$^2$, further thermal hardening was performed at 40° C. for 3 days, so as to obtain an adhesive agent 11 (transfer-type adhesive sheet).

Synthesis Example 12

Adhesive Agent 12

2-ethylhexyl acrylate (49.0 parts by mass), isobornyl acrylate (29.0 parts by mass), 2-hydroxyethyl acrylate (18.0 parts by mass), an isophorone diisocyanate adduct product (a trimethylolpropane reactant of isophorone diisocyanate, manufactured by Mitsui Chemicals, Inc., Product name: TAKENATE D-140N) (1 part by mass), IRGACURE 819 (manufactured by BASF SE) (2.0 parts by mass), and LUCIRIN TPO (manufactured by BASF SE) (1.0 part by mass) were mixed, so as to obtain a solution.

A release PET film was coated with the obtained solution, and a release surface of the release PET film was stuck on the coating liquid. A high pressure mercury UV lamp light (DEEP UV lamp UXM-501MD, manufactured by Ushio Inc.) was used, a sample interposed with the release PET films was irradiated with UV light such that irradiation energy became 3 J/cm$^2$, further thermal hardening was performed at 40° C. for 3 days, so as to obtain an adhesive agent 12 (transfer-type adhesive sheet).

Synthesis Example 13

Adhesive Agent 13

2-ethylhexyl acrylate (49.0 parts by mass), isobornyl acrylate (29.0 parts by mass), 2-hydroxyethyl acrylate (18.0 parts by mass), hexamethylene diacrylate (1 part by mass), IRGACURE 819 (manufactured by BASF SE) (2.0 parts by mass), and LUCIRIN TPO (manufactured by BASF SE) (1.0 part by mass) were mixed, so as to obtain a solution.

A release PET film was coated with the obtained solution, and a release surface of the release PET film was stuck on the coating liquid. A high pressure mercury UV lamp light (DEEP UV lamp UXM-501MD, manufactured by Ushio Inc.) was used, a sample interposed with the release PET films was irradiated with UV light such that irradiation energy became 3 J/cm$^2$, further thermal hardening was performed at 40° C. for 3 days, so as to obtain an adhesive agent 13 (transfer-type adhesive sheet).

Synthesis Example 14

Adhesive Agent 14

Isobornyl acrylate (SR506) (44.38 mass %), 1-hydroxy cyclohexyl phenyl ketone (IRGACURE (Registered trademark) 184) (1.6 mass %), pentaerythritol tetrakis(3-mercaptopropionate) PETAMAP (7.60 mass %), and aliphatic urethane diacrylate (EBECRYL (Registered trademark) 230) (46.42 mass %) were blended in a predetermined amount (in terms of mass), so as to prepare the adhesive agent 14.

Synthesis Example 15

Adhesive Agent 15

87.0 parts by mass of n-butyl acrylate, 10.0 parts by mass of cyclohexyl acrylate, 3.0 parts by mass of 2-hydroxyethyl acrylate, and 0.2 parts by mass of 2,2'-azobisisobutyronitrile as a polymerization initiator were dissolved in 100 parts by mass of ethyl acetate in a reaction container comprising a stirrer for preparing an acryl copolymer, a reflux condenser, a thermometer, a dripping funnel, and a nitrogen gas inlet and, after nitrogen substitution, polymerization was performed at 80° C. for 8 hours, so as to obtain an acryl copolymer (A1) having a weight average molecular weight of 900,000.

95.0 parts by mass of cyclohexylmethyl methacrylate, 5.0 parts by mass of dimethylaminoethyl methacrylate, and 1.0 part by mass of 2,2'-azobisisobutyronitrile as the polymerization initiator were dissolved in 100 parts by mass of ethyl acetate, in a reaction container comprising a stirrer for preparing an acryl copolymer, a reflux condenser, a thermometer, a dripping funnel, and a nitrogen gas inlet and, after nitrogen substitution, polymerization was performed at 80° C. for 8 hours, so as to obtain a methacryl copolymer (B1) having a weight average molecular weight of 20,000.

2.5 parts by mass of the methacryl copolymer (B1) was added to 100 parts by mass of the acryl copolymer (A1) and diluted in ethyl acetate, so as to obtain an adhesive agent (P1) having a resin solid content of 30 mass %.

0.1 parts by mass of an isocyanate-based crosslinking agent (D-160N manufactured by Mitsui Chemicals Polyurethanes, Inc., solid content: 75 mass %) was added to 100 parts by mass of the adhesive agent (P1) and stirred for 15 minutes, coating was performed on a polyester film (hereinafter, referred to as a #75 peeling film) having a thickness of 50 μm of which one surface was subjected to a release treatment with a silicone compound such that the thickness after drying became 25 μm, and drying was performed at 75° C. for 5 minutes. The obtained adhesive sheet and a polyester film (hereinafter, referred to as a #38 peeling film) having a thickness of 38 μm of which one surface was subjected to a release treatment with a silicone compound were stuck to each other. Thereafter, the resultant was aged at 23° C. for 7 days, and the adhesive agent 15 (adhesive sheet without a substrate) with a thickness of 25 μm and a gel fraction of 75% was obtained.

Synthesis Example 16

Adhesive Agent 16

0.3 parts by mass of a tolylene diisocyanate-based compound (manufactured by Nippon Polyurethane Industry Co., Ltd., CORONATE L) as a crosslinking agent, 0.7 parts by mass of pentaerythritol-tetrakis(3-(3,5-di-t-butyl-4-hydroxyphenyl)propionate) (manufactured by BASF Japan K.K., IRGANOX 1010) as a hindered phenol-based antioxidant, and 0.5 parts by mass of tris(2,4-di-t-butylphenyl) phosphite (manufactured by BASF Japan K.K., IRGAFOS 168) as a phosphorus-based antioxidant were blended to 100 parts by mass of the main agent of an acryl-based adhesive agent having 4.5 mass % of an 4-hydroxybutyl acrylate unit (4-HBA), 60 mass % of an butyl acrylate unit, and 35.5 mass % of an methyl acrylate unit, so as to obtain a composition (carboxy group-containing ratio: 0 mass %).

A first release sheet [manufactured by Oji F-Tex Co., Ltd., 38 μRL-07(2)] provided with a release agent layer on one surface of a polyethylene terephthalate film was coated with the obtained composition using a knife coater, heating was performed at 100° C. for 3 minutes, so as to form an adhesive agent layer.

A second release sheet [manufactured by Oji F-Tex Co., Ltd., 38 μRL-07(L)] provided with a release agent layer having release properties higher than the first release sheet on one side of the polyethylene terephthalate film was stuck to the adhesive agent layer, so as to obtain the adhesive agent 16 (double-sided adhesive sheet).

Synthesis Example 17

Adhesive Agent 17

Isobornyl acrylate (SR506) (42.16 mass %), 1-hydroxy cyclohexyl phenyl ketone (IRGACURE (Registered trademark) 184) (1.52 mass %), pentaerythritol tetrakis(3-mercaptopropionate) PETAMAP (7.22 mass %), aliphatic urethane diacrylate (EBECRYL (Registered trademark) 230) (44.10 mass %), and Fumed silica (DEGUSSA A200) (5 mass %) were blended in a predetermined amount (in terms of mass), so as to prepare the adhesive agent 17.

Examples 1 to 23 and Comparative Examples 1 to 11

Preparation of Halogenated Silver Emulsion

To the following liquid 1 kept at 38° C. at pH 4.5, the following liquid 2 and liquid 3 were simultaneously added for over 20 minutes under stirring in amounts of 90%, respectively, and thus nuclear particles of 0.16 μm were formed. Next, the following liquid 4 and liquid 5 were added for over 8 minutes, and the last 10% of the following liquid 2 and liquid 3 were added for over 2 minutes, respectively, to grow the particles up to 0.21 μm. 0.15 g of potassium iodide was added, the mixture was aged for 5 minutes, and the formation of the particles was completed.

Liquid 1:

| | |
|---|---|
| Water | 750 ml |
| Gelatin | 9 g |
| Sodium chloride | 3 g |
| 1,3-dimethylimidazolidine-2-thione | 20 mg |
| Sodium benzene thiosulfonate | 10 mg |
| Citric Acid | 0.7 g |

Liquid 2:

| | |
|---|---|
| Water | 300 ml |
| Silver nitride | 150 g |

Liquid 3:

| | |
|---|---|
| Water | 300 ml |
| Sodium chloride | 38 g |
| Potassium bromide | 32 g |
| Potassium hexachloroiridate (III) (0.005% KCl, 20% aqueous solution) | 8 ml |
| Ammonium hexachlororhodate (0.001% NaCl 20% aqueous solution) | 10 ml |

Liquid 4:

| | |
|---|---|
| Water | 100 ml |
| Silver nitride | 50 g |

Liquid 5:

| | |
|---|---|
| Water | 100 ml |
| Sodium chloride | 13 g |
| Potassium Bromide | 11 g |
| Yellow prussiate of potash | 5 mg |

Thereafter, the particles were rinsed in the usual manner through a flocculation method. Specifically, the temperature was reduced to 35° C., and the pH was reduced (pH 3.6±0.2) using a sulfuric acid until the halogenated silver was precipitated. Next, about 3 L of the supernatant was removed (first rinsing). 3 L of distilled water was added, and then a sulfuric acid was added until the halogenated silver was precipitated. 3 L of the supernatant was removed again (second rinsing). The same operation as the second rinsing was repeated once again (third rinsing), and the rinsing/desalination process was completed. The pH and the pAg of the emulsion after the rinsing and desalination were adjusted to 6.4 and 7.5, respectively, and 3.9 g of gelatin, 10 mg of sodium benzene thiosulfonate, 3 mg of sodium benzene thiosulfinate, 15 mg of sodium thiosulfate, and 10 mg of a chlorauric acid were added to perform chemical sensitization so as to obtain the optimum sensitivity at 55° C. 100 mg of 1,3,3a,7-tetraazaindene as a stabilizer and 100 mg of PROXEL (trade name, manufactured by ICI Co., Ltd.) as a preservative were added. The finally obtained emulsion was a cubic silver iodochlorobromide particle emulsion containing 0.08 mole % of silver iodide and having a silver chloride-bromide ratio of 70 mole % of silver chloride and 30 mole % of silver bromide, an average particle size of 0.22 μm, and a coefficient of variation of 9%.

(Preparation of Photosensitive Layer Forming Composition)

$1.2 \times 10^{-4}$ mole/moleAg of 1,3,3a,7-tetraazaindene, $1.2 \times 10^{-2}$ mole/moleAg of hydroquinone, $3.0 \times 10^{-4}$ mole/moleAg of a citric acid, and 0.90 g/moleAg of 2,4-dichloro-6-hydroxy-1,3,5-triazine sodium salt were added to the emulsion, and the pH of the coating liquid was adjusted to 5.6 using a citric acid. Thus, a photosensitive layer forming composition was obtained.

(Photosensitive Layer Forming Process)

A polyethylene terephthalate (PET) film having a thickness of 100 μm was subjected to a corona discharge treatment, and then a gelatin layer as an undercoat layer having a thickness of 0.1 μm was provided on both surfaces of the PET film, and an antihalation layer having an optical density of about 1.0 and containing a dye to be decolorized with alkali of a developer was provided on the undercoat layer. The photosensitive layer forming composition was applied to the antihalation layer, and a gelatin layer having a thickness of 0.15 μm was provided thereon, whereby a PET film having a photosensitive layer formed on both surfaces was obtained. The obtained film is set as a film A. The formed photosensitive layer had a silver amount of 6.0 g/m² and a gelatin amount of 1.0 g/m².

(Exposure and Development Process)

Both surfaces of the film A were exposed using parallel light with a high pressure mercury lamp as a light source via a photomask in which detection electrodes (first detection electrodes and second detection electrodes) and lead-out wires (first lead-out wirings and second lead-out wirings) were arranged as shown in FIG. 4. After the exposure, development was performed with a developer, and a development treatment was further performed using a fixing liquid (trade name: N3X-R for CH16X manufactured by Fujifilm Corporation). By performing rinsing with pure water and drying, a capacitive touch panel sensor comprising the detection electrodes composed of fine Ag wires and the lead-out wires provided on both surfaces was obtained.

In the obtained capacitive touch panel sensor, the detection electrodes are composed of fine conductive wires intersecting in a mesh state. As described above, the first detection electrodes are electrodes extending in the X-direction, and the second detection electrodes are electrodes extending in the Y-direction. The first detection electrodes and the second detection electrodes are disposed on the film at a pitch of 4.5 mm to 5.0 mm, respectively.

Next, a touch panel including a liquid crystal display, a lower adhesive layer (thickness: 200 µm), a capacitive touch panel sensor, an upper adhesive layer (thickness: 75 µm), and a glass substrate was manufactured. In addition, in the respective examples and comparative examples, types of the adhesive agents 1 to 17 (adhesive sheets and liquid compositions) used at the time of manufacturing the lower adhesive layer and the upper adhesive layer and the size of the display surface are collectively presented in Table 1 below.

In a method of manufacturing the touch panel, in a case where the upper adhesive layer was formed by using the adhesive sheet, on the capacitive touch panel sensor, adhesive sheets which were cut into the same size were attached to a capacitive touch panel sensor by using a roller with a load of 2 kg, and a glass protective substrate with the same size was further stuck to the upper adhesive layer by using a roller with a load of 2 kg. Otherwise, in a case where the upper adhesive layer was formed by using a liquid product, an appropriate amount of the liquid product (so-called OCR) was dripped on the capacitive touch panel sensor so as to have a predetermined film thickness. Thereafter, a glass protective substrate was stuck by expanding the liquid product so as to have a predetermined film thickness, and UV irradiation in a predetermined amount was performed, so as to harden the liquid product.

The capacitive touch panel sensor and the liquid crystal display device (display surface: the size in a diagonal direction is 5 inches or 10 inches) was able to be stuck to each other in the same method described above, and an adhesive sheet or a liquid product was used as the lower adhesive layer.

After the adhesive sheets were stuck, the defoaming treatment was performed by performing autoclave treatments at 40° C. at 5 atmospheres, for 20 minutes, every time. In a case where the adhesive sheet was stuck to the liquid product (so-called OCR), the sticking was performed under the vacuum environment, so as to manufacture the touch panel.

(Producing Sample for Temperature Dependency Evaluation Test)

Samples for temperature dependency evaluation test were produced by using the adhesive agents presented in Table 1.

In a case where the adhesive agent to be used was a liquid product (so-called OCR), the adhesive agent was applied on the Al (aluminum) substrate having vertical 20 mm×horizontal 20 mm, thickness of 0.5 mm, such that the film thickness became 100 µm to 500 µm, UV hardening was performed in a recommended condition, and thereafter separate Al substrates (vertical 20 mm×horizontal 20 mm, thickness 0.5 mm) were stuck to the formed adhesive layer. Thereafter, a pressurizing and defoaming treatment was performed at 5 atmospheres, at 40° C. for 60 minutes.

In addition, in a case where the adhesive agent to be used was an adhesive sheet (so-called OCA), a sheet which was adjusted to have a thickness of 100 µm to 500 µm was sandwiched between the Al substrates, a pressurizing and defoaming treatment was performed, so as to produce a sample.

With respect to the thickness of the adhesive layer in the respective samples, the thickness of the sample for the temperature dependency evaluation test was measured at five portions, and thicknesses of two sheets of the Al substrates were subtracted from the average value thereof, so as to calculate the thickness of the adhesive layer.

(Method of Temperature Dependency Evaluation Test)

Impedance measurement was performed at 100 kHz and 1 MHz with an impedance analyzer (4294A manufactured by Agilent Technologies), by using the sample for temperature dependency evaluation test which was produced as above, so as to measure tan σ of the adhesive layer.

Specifically, the temperature of the sample for the temperature dependency evaluation test was increased from −40° C. to 80° C. by 20° C. in stages, and tan σ was measured by the impedance measurement at 100 kHz and 1 MHz with an impedance analyzer (4294A manufactured by Agilent Technologies) at the respective temperatures. At the respective temperatures, the sample was stood still for five minutes, until the temperature of the sample became constant.

The adjustment of the temperature was performed by using a liquid nitrogen cooling stage in the case of the low temperature and a hot plate in the case of the high temperature.

(Malfunction Evaluation Method)

The temperature of the touch panel produced as described above was increased from −40° C. to 80° C. by 20° C. in stages, and rates of occurrence of malfunction at the time of touch at respective temperatures were measured. That is, arbitrary places were touched 100 times under environments of −40° C., −20° C., 0° C., 20° C., 40° C., 60° C., and 80° C., and the rate (%) of occurrence of malfunction of the touch panel [(number of unnormal reactions/100)×100] was measured from the number of cases in which an unnormal reaction occurred.

The maximum values of rates of occurrence of malfunction were calculated at the respective measured temperatures, and a case where the value was 5% or less was evaluated to OK, and a case where the value was greater than 5% was evaluated to NG.

In Table 1, the "maximum values of rates of occurrence of malfunction" was the maximum value of rates of the occurrence of malfunction at the respective temperatures.

In Table 1, the section of the "display surface size" means the size of the display surface of the display device. In the respective examples and comparative examples, the size of the input region in which the contact of the object of the capacitive touch panel sensor can be detected in the diagonal direction was also the same as the display surface.

"tan σ maximum value at the time of 100 kHz" and "tan σ maximum value at the time of 1 MHz" in the section of the "upper adhesive layer" in Table 1 mean the maximum value of tan σ of the upper adhesive layer at the respective temperatures obtained by performing the temperature dependency evaluation test at 100 kHz and 1 MHz. "tan σ maximum value at the time of 100 kHz" and "tan σ maximum value at the time of 1 MHz" in the section of the "lower adhesive layer" in Table 1 mean the maximum value of tan σ of the lower adhesive layer at the respective temperatures obtained by performing the temperature dependency evaluation test at 100 kHz and 1 MHz.

In Examples 1 to 23, tan σ of the lower adhesive layer at respective temperatures obtained by performing the temperature dependency evaluation test at 100 kHz was tan σ or less of the upper adhesive layer at the respective temperatures obtained by performing the temperature dependency evaluation test at 100 kHz at the respective temperatures. Specifically, tan σ of the lower adhesive layer was smaller than tan σ of the upper adhesive layer at the respective temperatures. In other words, the relationship of Expression (1) above was satisfied.

In Examples 1 to 23, tan σ of the lower adhesive layer at the respective temperatures obtained by performing the temperature dependency evaluation test at 1 MHz was tan σ or less of the upper adhesive layer at the respective temperatures obtained by performing the temperature dependency evaluation test at 1 MHz at the respective temperatures. Specifically, tan σ of the lower adhesive layer was smaller than tan σ of the upper adhesive layer at respective temperatures. In other words, the relationship of Expression (2) above was satisfied.

As shown in Table 1, it was confirmed that malfunction hardly occurred from the low temperature to the high temperature in the touch panel according to the invention.

Meanwhile, in Comparative Examples 1 to 11 in which tan σ of the lower adhesive layer and the upper adhesive layer does not satisfy predetermined requirements, malfunction easily occurred, and desired effects was not able to be obtained.

EXPLANATION OF REFERENCES

10: capacitive touch panel
12: display device
14: lower adhesive layer
16, 260, 360: capacitive touch panel sensor
18: upper adhesive layer
20: protective substrate
22: substrate
24: first detection electrode

TABLE 1

| | | Upper adhesive layer | | | Lower adhesive layer | | | | |
|---|---|---|---|---|---|---|---|---|---|
| | Display surface size | Adhesive agent type | tan σ maximum value at the time of 100 kHz | tan σ maximum value at the time of 1 MHz | Adhesive agent type | tan σ maximum value at the time of 100 kHz | tan σ maximum value at the time of 1 MHz | Maximum values of rates of occurrence of malfunction | Evaluation |
| Example 1 | 10 | Adhesive agent 1 | 0.025 | 0.013 | Adhesive agent 2 | 0.014 | 0.011 | 1% | OK |
| Example 2 | 5 | Adhesive agent 1 | 0.025 | 0.013 | Adhesive agent 2 | 0.014 | 0.011 | 0% | OK |
| Example 3 | 10 | Adhesive agent 3 | 0.075 | 0.065 | Adhesive agent 2 | 0.014 | 0.011 | 4% | OK |
| Example 4 | 10 | Adhesive agent 4 | 0.075 | 0.065 | Adhesive agent 2 | 0.014 | 0.011 | 4% | OK |
| Example 5 | 10 | Adhesive agent 5 | 0.075 | 0.065 | Adhesive agent 2 | 0.014 | 0.011 | 4% | OK |
| Example 6 | 10 | Adhesive agent 6 | 0.065 | 0.060 | Adhesive agent 2 | 0.014 | 0.011 | 3% | OK |
| Example 7 | 10 | Adhesive agent 7 | 0.065 | 0.060 | Adhesive agent 2 | 0.014 | 0.011 | 3% | OK |
| Example 8 | 10 | Adhesive agent 8 | 0.065 | 0.060 | Adhesive agent 2 | 0.014 | 0.011 | 3% | OK |
| Example 9 | 10 | Adhesive agent 3 | 0.075 | 0.065 | Adhesive agent 6 | 0.065 | 0.060 | 5% | OK |
| Example 10 | 10 | Adhesive agent 4 | 0.075 | 0.065 | Adhesive agent 6 | 0.065 | 0.060 | 5% | OK |
| Example 11 | 10 | Adhesive agent 5 | 0.075 | 0.065 | Adhesive agent 6 | 0.065 | 0.060 | 5% | OK |
| Example 12 | 10 | Adhesive agent 3 | 0.075 | 0.065 | Adhesive agent 7 | 0.065 | 0.060 | 5% | OK |
| Example 13 | 10 | Adhesive agent 4 | 0.075 | 0.065 | Adhesive agent 7 | 0.065 | 0.060 | 5% | OK |
| Example 14 | 10 | Adhesive agent 5 | 0.075 | 0.065 | Adhesive agent 7 | 0.065 | 0.060 | 5% | OK |
| Example 15 | 10 | Adhesive agent 3 | 0.075 | 0.065 | Adhesive agent 8 | 0.065 | 0.060 | 5% | OK |
| Example 16 | 10 | Adhesive agent 4 | 0.075 | 0.065 | Adhesive agent 8 | 0.065 | 0.060 | 5% | OK |
| Example 17 | 10 | Adhesive agent 5 | 0.075 | 0.065 | Adhesive agent 8 | 0.065 | 0.060 | 5% | OK |
| Example 18 | 10 | Adhesive agent 3 | 0.075 | 0.065 | Adhesive agent 9 | 0.030 | 0.030 | 2% | OK |
| Example 19 | 10 | Adhesive agent 4 | 0.075 | 0.065 | Adhesive agent 9 | 0.030 | 0.030 | 2% | OK |
| Example 20 | 10 | Adhesive agent 5 | 0.075 | 0.065 | Adhesive agent 9 | 0.030 | 0.030 | 2% | OK |
| Example 21 | 10 | Adhesive agent 6 | 0.065 | 0.060 | Adhesive agent 9 | 0.030 | 0.030 | 3% | OK |
| Example 22 | 10 | Adhesive agent 7 | 0.065 | 0.060 | Adhesive agent 9 | 0.030 | 0.030 | 3% | OK |
| Example 23 | 10 | Adhesive agent 8 | 0.065 | 0.060 | Adhesive agent 9 | 0.030 | 0.030 | 3% | OK |
| Comparative Example 1 | 10 | Adhesive agent 10 | 0.100 | 0.110 | Adhesive agent 14 | 0.110 | 0.115 | 19% | NG |
| Comparative Example 2 | 10 | Adhesive agent 11 | 0.100 | 0.110 | Adhesive agent 14 | 0.110 | 0.115 | 19% | NG |
| Comparative Example 3 | 10 | Adhesive agent 12 | 0.100 | 0.110 | Adhesive agent 14 | 0.110 | 0.115 | 19% | NG |
| Comparative Example 4 | 10 | Adhesive agent 13 | 0.100 | 0.110 | Adhesive agent 14 | 0.110 | 0.115 | 19% | NG |
| Comparative Example 5 | 10 | Adhesive agent 15 | 0.090 | 0.085 | Adhesive agent 1 | 0.025 | 0.013 | 10% | NG |
| Comparative Example 6 | 10 | Adhesive agent 16 | 0.100 | 0.120 | Adhesive agent 17 | 0.085 | 0.120 | 15% | NG |
| Comparative Example 7 | 5 | Adhesive agent 10 | 0.100 | 0.110 | Adhesive agent 14 | 0.110 | 0.115 | 7% | NG |
| Comparative Example 8 | 5 | Adhesive agent 11 | 0.100 | 0.110 | Adhesive agent 14 | 0.110 | 0.115 | 7% | NG |
| Comparative Example 9 | 5 | Adhesive agent 12 | 0.100 | 0.110 | Adhesive agent 14 | 0.110 | 0.115 | 7% | NG |
| Comparative Example 10 | 5 | Adhesive agent 13 | 0.100 | 0.110 | Adhesive agent 14 | 0.110 | 0.115 | 7% | NG |
| Comparative Example 11 | 10 | Adhesive agent 1 | 0.025 | 0.013 | Adhesive agent 14 | 0.110 | 0.115 | 9% | NG |

26: first lead-out wirings
28: second detection electrode
30: second lead-out wirings
32: flexible print wiring board
34: fine conductive wire
36: lattice
38: first substrate
40: adhesive layer
42: second substrate
100: aluminum electrode

What is claimed is:

1. A capacitive touch panel, comprising:
a display device;
a lower adhesive layer;
a capacitive touch panel sensor;
an upper adhesive layer; and
a protective substrate, in this order,
wherein a maximum value of tan σ of the upper adhesive layer and a maximum value of tan σ of the lower adhesive layer, which are obtained from a temperature dependency evaluation test (Test 1) are 0.08 or less, and also tan σ of the lower adhesive layer at respective temperatures of every 20° C. from −40° C. to 80° C. is tan σ or less of the upper adhesive layer, and
wherein a maximum value of tan σ of the upper adhesive layer and a maximum value of tan σ of the lower adhesive layer which are obtained from a temperature dependency evaluation test (Test 2) are 0.08 or less, and also tan σ of the lower adhesive layer at respective temperatures of every 20° C. from −40° C. to 80° C. is equal to or less than tan σ of the upper adhesive layer:
Temperature dependency evaluation test (Test 1): an adhesive layer is sandwiched between aluminum electrodes, the temperature increases by 20° C. from −40° C. to 80° C., and tan σ of the adhesive layer is calculated by the impedance measurement at 100 kHz at each temperature, and
Temperature dependency evaluation test (Test 2): an adhesive layer is sandwiched between aluminum electrodes, the temperature increases by 20° C. from −40° C. to 80° C., and tan σ of the adhesive layer is calculated by the impedance measurement at 1 MHz at each temperature.

2. The capacitive touch panel according to claim 1, wherein a maximum value of tan σ of the upper adhesive layer and a maximum value of tan σ of the lower adhesive layer obtained from the temperature dependency evaluation test (Test 1) are 0.06 or less, and wherein a maximum value of tan σ of the upper adhesive layer and a maximum value of tan σ of the lower adhesive layer obtained from the temperature dependency evaluation test (Test 2) are 0.06 or less.

3. The capacitive touch panel according to claim 1, wherein the capacitive touch panel sensor is a laminate comprising detection electrodes on both surfaces of the substrate and a laminate obtained by sticking substrates with detection electrodes comprising detection electrodes on one surface thereof via an adhesive layer.

4. The capacitive touch panel according to claim 2, wherein the capacitive touch panel sensor is a laminate comprising detection electrodes on both surfaces of the substrate and a laminate obtained by sticking substrates with detection electrodes comprising detection electrodes on one surface thereof via an adhesive layer.

5. The capacitive touch panel according to claim 3, wherein the detection electrode is configured with any one selected from the group consisting of gold, silver, copper, aluminum, ITO, tin oxide, zinc oxide, cadmium oxide, gallium oxide, titanium oxide, a silver palladium alloy, and a silver palladium copper alloy.

6. The capacitive touch panel according to claim 4, wherein the detection electrode is configured with any one selected from the group consisting of gold, silver, copper, aluminum, no, tin oxide, zinc oxide, cadmium oxide, gallium oxide, titanium oxide, a silver palladium alloy, and a silver palladium copper alloy.

7. The capacitive touch panel according to claim 1, wherein a size of the display surface of the display device in the diagonal direction is 5 inches or greater.

8. The capacitive touch panel according to claim 2, wherein a size of the display surface of the display device in the diagonal direction is 5 inches or greater.

9. The capacitive touch panel according to claim 3, wherein a size of the display surface of the display device in the diagonal direction is 5 inches or greater.

10. The capacitive touch panel according to claim 4, wherein a size of the display surface of the display device in the diagonal direction is 5 inches or greater.

11. The capacitive touch panel according to claim 5, wherein a size of the display surface of the display device in the diagonal direction is 5 inches or greater.

12. The capacitive touch panel according to claim 6, wherein a size of the display surface of the display device in the diagonal direction is 5 inches or greater.

* * * * *